(12) United States Patent
Edwards

(10) Patent No.: US 12,189,812 B2
(45) Date of Patent: Jan. 7, 2025

(54) PRIVACY CONTROLS FOR EXTENDED REALITY (XR) APPLICATIONS

(71) Applicant: Adeia Guides Inc., San Jose, CA (US)

(72) Inventor: Warren Keith Edwards, Atlanta, GA (US)

(73) Assignee: Adeia Guides Inc., San Jose, CA (US)

( * ) Notice: Subject to any disclaimer, the term of this patent is extended or adjusted under 35 U.S.C. 154(b) by 196 days.

(21) Appl. No.: 17/987,013

(22) Filed: Nov. 15, 2022

(65) Prior Publication Data

US 2024/0160774 A1 May 16, 2024

(51) Int. Cl.
*G06F 21/00* (2013.01)
*G06F 21/62* (2013.01)
*G06F 3/04847* (2022.01)

(52) U.S. Cl.
CPC ...... *G06F 21/6245* (2013.01); *G06F 3/04847* (2013.01)

(58) Field of Classification Search
CPC .. G06F 21/6245; G06F 3/04847; G06F 3/011; G06F 3/013; G06F 3/04815; G06F 3/0482; G06F 3/04845
See application file for complete search history.

(56) References Cited

U.S. PATENT DOCUMENTS

| | | | |
|---|---|---|---|
| 10,531,038 B2 | 1/2020 | Farrell et al. | |
| 10,991,128 B2 | 4/2021 | Glazberg et al. | |
| 11,030,440 B2 | 6/2021 | Barnett et al. | |
| 11,082,731 B1 | 8/2021 | Cox et al. | |
| 11,139,958 B2 | 10/2021 | Smith et al. | |
| 11,217,032 B1 | 1/2022 | Glazberg et al. | |
| 11,321,487 B2* | 5/2022 | Kwatra | H04W 12/63 |
| 11,855,932 B2* | 12/2023 | Zweig | G06N 3/008 |
| 2017/0169237 A1* | 6/2017 | Calo | G06F 21/83 |
| 2018/0189552 A1* | 7/2018 | Barnett | G06V 40/172 |
| 2018/0247075 A1* | 8/2018 | Aistrope | G06F 16/51 |
| 2018/0322674 A1 | 11/2018 | Du | |

(Continued)

FOREIGN PATENT DOCUMENTS

EP 3069544 B1 6/2017

OTHER PUBLICATIONS

ARKit: on Scanning and Detecting 3D Objects, https://developer.apple.com/documentation/arkit/content_anchors/scanning_and_detecting_3d_objects (18 pages).

(Continued)

*Primary Examiner* — Kendall Dolly
(74) *Attorney, Agent, or Firm* — Haley Guiliano LLP

(57) ABSTRACT

Systems and methods are described for preserving the privacy of a user in connection with an extended reality (XR) application. The system and methods may receive, by an interposer application, image data from a video capture driver and determine, by the interposer application and based on privacy preferences of a user profile, whether a region of the image data comprises sensitive content. In response to determining that a region of the image data comprises sensitive content, the image data may be modified by applying, by the interposer application, a modification to the region of the image data. The modified image data may be provided by the interposer application to the XR application, wherein the wherein the XR application may be prohibited from directly accessing data from the video capture driver.

22 Claims, 12 Drawing Sheets

(56) References Cited

U.S. PATENT DOCUMENTS

| | | | |
|---|---|---|---|
| 2021/0084194 A1* | 3/2021 | Rakshit | G06V 40/164 |
| 2022/0189036 A1* | 6/2022 | Park | G06T 5/20 |
| 2022/0245279 A1 | 8/2022 | Glazberg et al. | |
| 2022/0308654 A1* | 9/2022 | Chen | A63F 13/26 |
| 2023/0162450 A1* | 5/2023 | Gutensohn | G06T 19/006 |
| | | | 345/633 |
| 2023/0289476 A1* | 9/2023 | Bonat | G06F 16/955 |
| 2024/0078751 A1* | 3/2024 | Fieldman | G06T 17/00 |
| 2024/0137391 A1* | 4/2024 | Buck | H04L 61/4511 |
| 2024/0256711 A1* | 8/2024 | Taguchi | G06T 13/40 |

OTHER PUBLICATIONS

Privacy and Security, webxr, https://immersive-web.github.io/webxr/privacy-security-explainer.html, (15 pages).

* cited by examiner

Privacy Preferences for XR Application A — 302

Apply to all Other XR Applications? — 304
- ☐ Yes — 303
- ☑ No — 305

Camera — 306

Allow Direct Access to all Image Data — 308
- ☐ Yes — 307
- ☑ No — 309

Allow Access to Certain Modified Image Data — 310
- ☑ Yes — 311
- ☐ No — 313

Allow Access to Unmodified Image Data of Object A in Home — 301
- ☐ Yes — 315
- ☑ No — 317

Allow Access to Unmodified Image Data of User B in Home — 312
User A
- ☑ Yes — 319
- ☐ No — 321

Select Room(s) in which Access to Unmodified Image Data of User B is Permitted — 314
- ☐ User B's Bedroom — 323
- ☑ Living Room — 325

Select Time(s) during which Access to Unmodified Image Data of User B is Permitted — 316
- ☐ 9 AM - 5 PM — 327
- ☑ 5 PM - 9 AM — 329

[Submit] — 318  [Cancel] — 320

FIG. 3A

Privacy Preferences for XR Application A — 332

Apply to all Other XR Applications? — 334
- 333 Yes ☐   335 ✓ No

Camera - Modifications for User B — 331
Privacy Descriptors — 337

- 336 Remove Image of User B — Yes ☐   No ☐
- 338 Obscure Face of User B — Yes ✓   No ☐
- 340 Obscure Entire Body of User B — Yes ☐   No ✓
- 342 Cartoonify Body of User B — Yes ☐   No ✓
- 344 Cartoonify Face of User B — Yes ☐   No ✓
- 346 Render Face or Body of User B as an Outline — Yes ☐   No ✓

Camera - Modifications for Object A
Privacy Descriptors

- 348 Remove Object from Image — Yes ☐   No ✓
- 350 Obscure Object — Yes ✓   No ☐
- 352 Replace Object with an Outline — Yes ☐   No ✓
- 354 Alter Color of Object — Yes ☐   No ✓

Camera - Modifications for Home
Privacy Descriptors

- 356 Obscure Background — Yes ☐   No ✓
- 358 Completely Elide Background — Yes ☐   No ✓
- 360 Replace Background with Shapes — Yes ☐   No ✓
- 362 No Background at all — Yes ☐   No ✓

User A

Submit   Cancel

FIG. 3B

| Privacy Preferences for XR Application A — 339 | | | 363 | | |
|---|---|---|---|---|---|
| | | | | | User A |
| Apply to all Other XR Applications? — 341 | ☐ Yes | ☑ No | Allow Access to Unmodified Audio Data of User B in Home — 349 | ☐ Yes | ☑ No |
| Microphone | | | | | |
| Allow Direct Access to all Audio Data — 343 | ☐ Yes | ☑ No | Allow Access to Unmodified Audio Data of Dog Barking — 351 | ☑ Yes | ☐ No |
| Allow Access to Certain Modified Audio Data — 345 | ☑ Yes | ☐ No | Modifications to Audio Data — 353 | | |
| Prevent Access to all Detected Voices — 347 | ☐ Yes | ☑ No | Strip Out Restricted Audio Data — 355 | ☑ Yes | ☐ No |
| | | | Modify Restricted Audio Data to Prevent Speaker Identification | ☐ Yes | ☑ No |
| Submit | | | Cancel | | |

| 402 Managed Applications | 404 Image Sensor | 406 Microphone |
|---|---|---|
| XR Application A | • Do not Allow Direct Access to Image Data<br>• Allow Access to Certain Modified Image Data<br>• Do not Allow Access to Unmodified Image Data of Object A in Home (Obscure Object)<br>• Allow Access to Unmodified Image Data of User B in Home<br>    ○ Allow Unmodified Access in Living Room (from 9 AM - 5 PM)<br>    ○ Do not Allow Unmodified Access in User B's Bedroom (Obscure Face of User B)<br>• Allow Access to Background | • Do not Allow Direct Access to Audio Data<br>• Allow Access to Certain Modified Audio Data<br>• Do not Prevent Access to all Detected Voices<br>• Do not Allow Access to Unmodified Audio Data of User B in Home<br>• Allow Access to Dog Barking |
| XR Application B | • Allow Direct Access to Image Data | • Do not Allow Direct Access to Audio Data<br>• Allow Access to Certain Modified Audio Data<br>• Prevent Access of all Detected Voices (Strip Out all Voices)<br>• Allow Access to Dog Barking |
| XR Application C | • Do not Allow Direct Access to Image Data<br>• Allow Access to Certain Modified Image Data<br>• Do not Allow Access to Unmodified Image Data of Object A in Home (Replace Object with Outline)<br>• Do not Allow Access to Image Data of User B in Home (Remove Image of User B) | • Do not Allow Direct Access to Audio Data<br>• Allow Access to Certain Modified Audio Data<br>• Allow Access to Audio Data of User A at 5 PM (After Work) in Home<br>• Do not Allow Access to Unmodified Audio Data of User B in Home |

FIG. 4

PRIVACY CONTROLS FOR EXTENDED REALITY (XR) APPLICATIONS

BACKGROUND

This disclosure is directed to systems and methods for preserving the privacy of a user in connection with an extended reality (XR) application. In particular, techniques are disclosed for providing an interposer application configured to modify, based on privacy preferences of the user, image data captured by a video capture driver, and provide the modified image data to the XR application, which may be prohibited from directly accessing data from the video capture driver.

SUMMARY

Advancements in media technology have led to development of extended reality (XR) technologies, such as virtual reality (VR), augmented reality (AR) and mixed reality (MR) technologies. VR systems may fully immerse (e.g., giving the user a sense of being in an environment) or partially immerse (e.g., giving the user the sense of looking at an environment) users in a three-dimensional (3D), computer-generated environment. AR systems may provide a modified version of reality, such as enhanced information overlaid over real-world objects. MR systems map interactive virtual objects to the real world. Such systems may utilize wearables, such as a head-mounted device, comprising a stereoscopic display, or smart glasses.

While XR technologies provide many benefits, many XR applications (e.g., applications with XR capabilities such as Snapchat®, TikTok®, Instagram®, Facebook®, or any other suitable XR application) require that sensors of a user's device, such as cameras, microphones, or depth sensors, be continuously engaged in order for the XR application to perform its functions. Such XR applications may collect a large amount of user data that the user may not wish to be collected. In one approach, when an XR application needs access to a hardware sensor such as a camera or depth sensor, it makes a request to the operating system (OS), such as when the XR application is installed or the first time the XR application is run on the user's device. The OS then posts a dialog box informing the user that the application is requesting access, which the user can either allow or deny. Once the application has acquired the permission to use the camera or other sensor, it generally has the ability to do so (e.g., capture camera data and depth data on a frame-by-frame basis) until permission is explicitly rescinded by the user. In such approach, raw image data that is captured is often passed to the XR application to enable the XR application to perform tasks such as identifying specific objects in the camera's field of view, determining placement for virtual augmentations, and so forth.

However, in the above-described approach, such unfettered access to sensors and/or raw image data is a significant privacy risk. For example, an unscrupulous (or even just poorly coded) XR application could capture a full 3D scan of a user's home, record high resolution video of every room in a user's home in which a device is worn, upload pictures or facial images of a user's children or other individuals who enter the camera's field of view, or record data about objects and possessions throughout the user's home. In such an approach, the XR application does not perform a check at runtime when capturing or receiving such image data. Instead, the entire raw image capture is passed to the application so that it can be composited with virtual content, thereby allowing the application to capture, store, process, transmit, sell or do anything it wishes with such data, regardless of what is in the scene. In this instance, if the user wants to utilize the XR application, he or she must decide to trust the XR application not to mis-use his or her data. Simply providing a binary choice for a user to allow access to all data or prohibit access to all data for an XR application (in which case the XR application may not be capable of being used) does not address privacy concerns of users, and does not allow a user to selectively choose which data is permitted to be provided to certain applications. A more granular approach to privacy controls and data access is needed for various different XR applications.

To overcome these problems, systems, apparatuses and methods are provided herein that allow for enhanced privacy restrictions with respect to data provided to XR applications, while still preserving the ability of such XR applications to create useful XR augmentations. Implementing any of the one or more of the techniques described herein, a system or systems may be configured to receive, by an interposer application, image data from a video capture driver. The system(s) may be configured to determine, by the interposer application and based on privacy preferences of a user profile, whether a region of the image data comprises sensitive content. In response to determining that a region of the image data comprises sensitive content, the system(s) modify the image data by applying, by the interposer application, a modification to the region of the image data. The system(s) may provide, by the interposer application and to the XR application, the modified image data, wherein the XR application is prohibited from directly accessing data from the video capture driver. Accordingly, the user may now be required to trust only a single application (e.g., the interposer application) with sensitive data, rather than having to trust how each application the user interacts with handles sensitive data. In some embodiments, the privacy preferences of the user profile may be applied globally (across all XR applications), or on an application-by-application basis, giving users fine-grained control over which XR applications have access to sensitive data. For example, the interposer application may enable the user to specify different sets of privacy preferences for different applications, on a per-application level.

Such aspects may enable an XR application's access to certain regions or contents of the image to be restricted on a frame-by-frame basis, such as, for example, based on a particular XR application that is to receive image data and/or contents of the image data (e.g., a particular scene) and/or any other suitable factor, rather than an all-or-nothing permissions scheme. This may enable preventing, such as on a frame-by-frame basis, malicious or untrusted XR applications from garnering access to sensitive data. In some embodiments, such restrictions may be based on user-specified privacy preferences or privacy policies in a user's profile, or preferences otherwise recommended by the interposer application or based on any other suitable mechanism of specifying preferences. In some embodiments, the interposer application may be a software layer that sits between the OS, and/or an XR framework (e.g., provided by a mobile platform vendor or other platform vendor), and the XR application, and mediates between them. In some embodiments, the interposer application may be embedded in such an XR framework, providing a common set of application programming interfaces (APIs) and user interfaces for managing XR privacy across a plurality of XR applications. The interposer application may be configured to apply one or more rules (e.g., based on the privacy preferences of the user profile) to captured image data (or other suitable data, such as, for example, audio data or textual data or any other suitable data) to perform modification to the image data. In some embodiments, the interposer application may be configured to elide or otherwise modify one or more portions or attributes of the image data before passing it to the XR application, based on privacy preferences of the user profile.

In some aspects of this disclosure, the XR application is a first XR application, and the method further comprises determining, based on the privacy preferences of the user profile, that the first XR application is prohibited from directly accessing data from the video capture driver; and determining, based on the privacy preferences of the user profile, that a second XR application is permitted to directly access data from the video capture driver.

In some embodiments, the XR application is a first XR application, and the interposer application is configured to manage access to image data from the video capture driver for a plurality of XR applications including the first XR application, based on the privacy preferences of the user profile. The privacy preferences may indicate first criteria for determining whether a region of image data comprises sensitive content for the first XR application and may indicate second criteria for determining whether a region of image data comprises sensitive content for a second XR application of the plurality of XR applications, the first criteria being different from the second criteria. That is, different XR applications may be granted different levels of trust and/or access, resulting in different interactions with the interposer application. Image or video modification may be dependent on the nature of the sensitive data in question (e.g., corresponding to faces of family members or corresponding to objects deemed sensitive) and/or dependent on the receiving application. For example, a user may consider depictions of family members to be sensitive and may prohibit a first XR application from receiving such depictions (resulting in image modification as described herein) while allowing a second XR application to receive such depictions.

In some aspects of this disclosure, the privacy preferences indicate that, with respect to the XR application, a particular user being at a particular location within a particular environment comprises sensitive content. The system(s) may determine that the region of the image data comprises sensitive content by determining that the region of the image data corresponds to the particular user at the particular location within the particular environment. The system(s) may perform the modifying of the image data based on the privacy preferences and based on determining that the image data is to be transmitted to the XR application.

In some embodiments, the privacy preferences indicate that, with respect to the XR application, a particular object comprises sensitive content. The provided system(s) may determine that the region of the image data comprises sensitive content by, for example, determining that the region of the image data corresponds to the particular object. The provided system(s) may perform the modifying of the image data based on the privacy preferences and based on determining that the image data is to be transmitted to the XR application.

In some aspects of this disclosure, the privacy preferences indicate that, with respect to the XR application, image data that is captured at a particular time and/or a particular location comprises sensitive content. The provided system(s) may determine that the region of the image data comprises sensitive content by, for example, determining that the image data was captured at the particular time and/or the particular location. The provided system(s) may perform the modifying of the image data based on the privacy preferences and based on determining that the image data is to be transmitted to the XR application.

In some embodiments, the provided system(s) may modify the image data in a manner that comprises removing the region from the image data, obscuring the region or substituting other content for the region.

In some aspects of this disclosure, the provided system(s) may receive, by the interposer application, audio data and determine, by the interposer application and based on the privacy preferences of the user profile, whether a portion of the audio data comprises sensitive content with respect to the XR application. The provided system(s), in response to determining that a portion of the audio data comprises sensitive content with respect to the XR application, may modify the audio data by applying, by the interposer application, a modification to the portion of the audio data. The system(s) may provide, by the interposer application and to the XR application, the modified audio data.

In some embodiments, the provided system(s) may generate for display, by the interposer application, a graphical user interface providing a plurality of options for specifying privacy preferences for a plurality of XR applications including the XR application. The provided system(s) may receive input associated with whether a region of image data should be considered sensitive content for the XR application, and determine the privacy preferences of the user profile for the XR application based on the received input.

In some aspects of this disclosure, the provided system(s) may detect an object in the image data not associated with the privacy preferences; prompt the user with a request to specify whether the detected object should be associated with the privacy preferences, and update the privacy preferences based on a response to the prompting.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIGS. 3A-3C show illustrative graphical user interfaces, in accordance with some embodiments of this disclosure.

FIG. 4 shows an illustrative data structure, in accordance with some embodiments of this disclosure.

DETAILED DESCRIPTION

Figure 1:
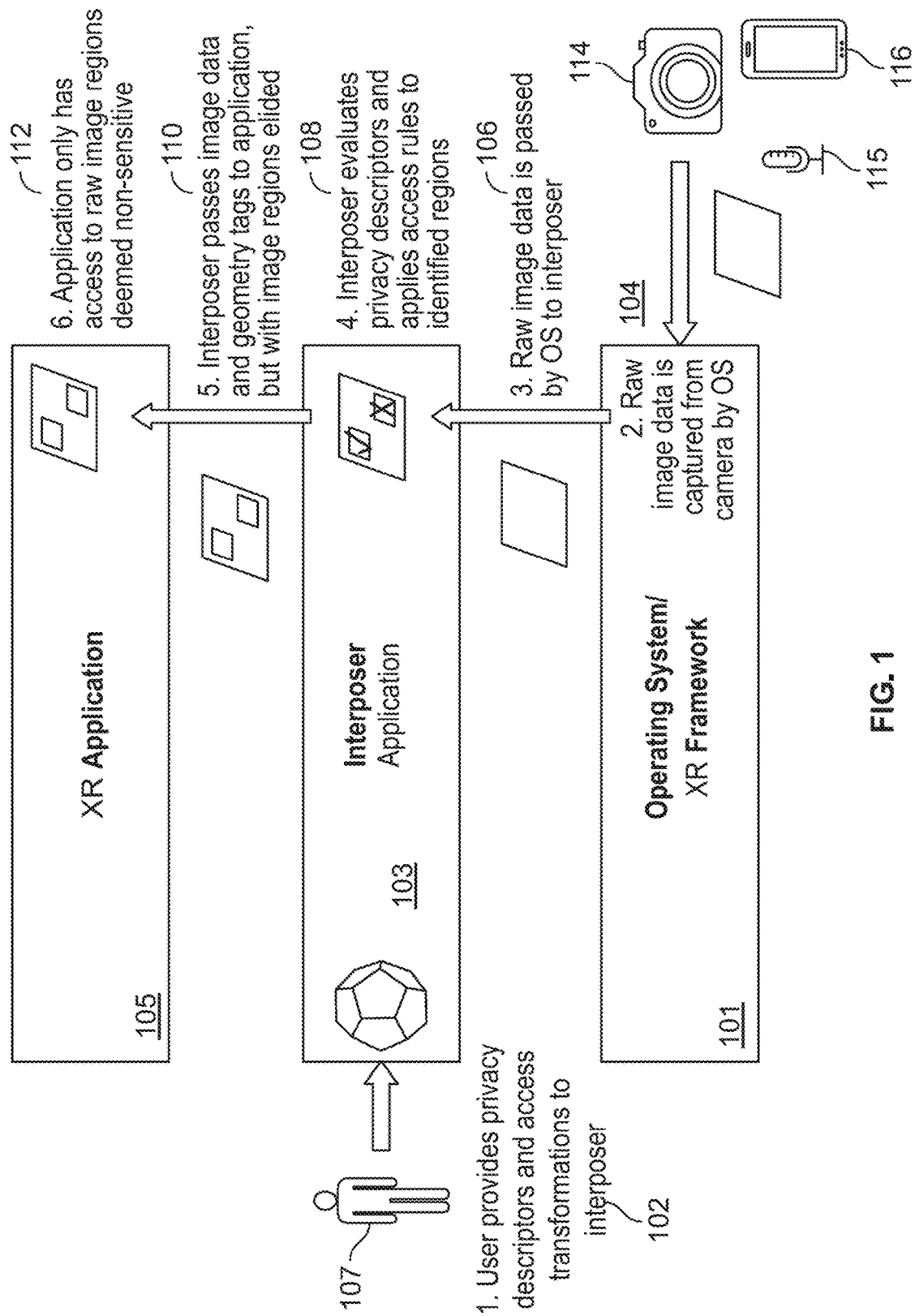
FIG. 1 shows an illustrative system for controlling an extended reality application's access to image data, in accordance with some embodiments of this disclosure.

FIG. 1 shows an illustrative system for controlling an extended reality application's access to image data, in accordance with some embodiments of this disclosure. System 100 may comprise operating system (OS)/extended reality (XR) framework 101, interposer application 103 and XR application 105. In some embodiments, interposer application 103 (e.g., executing at least in part at user device 116 and/or one or more remote servers or other computing devices) may be understood as a software layer that sits between XR application 105 (e.g., executing at least in part at user device 116 and/or one or more remote servers or other computing devices) and OS/XR framework 101 (e.g., executing at least in part at user device 116 and/or one or more remote servers or other computing devices). In some embodiments, the interposer application may be understood as middleware or application software or any combination thereof. Interposer application 103 may be configured to provide fine-grained controls over an XR application's access to data. In some embodiments, interposer application 103 may be a separate software layer implemented at least in part at user device 116 or any other suitable device(s). Alternatively, interposer application 103 may be embedded into OS/XR framework 101 provided by a platform (e.g., a mobile device operating system or other computing platform or other vendor), and/or interposer application 103 may be configured to provide a common set of APIs and user interfaces for managing XR privacy across applications. The XR framework may be provided by the platform to support the implementation of XR functions and experiences at user device 116, and may be considered as part of the OS or as separate from the OS.

XR may be understood as augmented reality (AR), virtual reality (VR), or mixed reality (MR) or any combination thereof. OS/XR framework 101 can be any operating system that supports the basic functions of device 116 for executing application programs and hardware interfaces and providing basic services and information these programs use when running OS/XR framework 101 may be operable to initialize and control the various software and/or hardware components of user device 116. XR application 105 may be any suitable application that provides XR functionality the user may interact with and/or observe, e.g., a social media application with XR capabilities such as to augment images or videos with a virtual object, a live streaming application, a video communication or video conferencing application, a content consumption application, or any other suitable application capable of providing XR features or any combination thereof. User device 116 associated may be, e.g., a mobile device such as a smartphone or tablet, a laptop, a desktop computer, a smart watch or wearable device, smart glasses, a stereoscopic display, a smart television, a wearable camera, AR glasses, an AR head-mounted display (HMD), a virtual reality (VR) HMD or any other suitable computing device, or any combination thereof.

At 102, the interposer application 103 may receive from user 107 one or more selections of privacy preferences, and may store such privacy preferences as part of a user profile or user account for user 107. In some embodiments, the interposer application 103 may maintain a data structure (e.g., a table, a list or any other suitable data structure or any combination thereof) storing indications of per-user, per-object, and per-environment access controls, which can be received from user 107. In some embodiments, the interposer application 103 may receive from user 107 associated with the user profile a set of rules that describe the privacy preferences or privacy restrictions that should be placed on image data and/or other data. In some embodiments, the rules may comprise privacy descriptors that describe a set of objects, people, and/or places that are to be considered sensitive, and thus have restricted access with respect to XR applications.

In some embodiments, the privacy descriptors can be applied either globally (across all XR applications), or on an application-by-application basis, giving users fine-grained control over which applications have access to sensitive data. In some embodiments, the access rules may be shared at a platform provider and distributed down to individual clients, such that a user's privacy rules may be respected across application instances. In some embodiments, the interposer application may receive a set of privacy preferences (e.g., privacy descriptors and associated access transformations) the first time interposer application 103 or XR application 105 is run, or based on a system-wide set of user preferences that apply to any suitable number of XR applications associated with the user profile of user 107.

At 104, OS/XR framework 101 may obtain raw image data and/or any other suitable data (e.g., audio data, biometric data, textual data, tactile input data or any other suitable data or any combination thereof) from a sensor (e.g., sensor 114 or sensor 115 or any other suitable sensor or any combination thereof) of user device 116 (or external to use device 116, such as, for example, a security camera or voice assistant in a same environment as user device 116). In some embodiments, the image data may correspond to an environment surrounding user device 116 and may comprise persons, objects, landmarks, structures or any other suitable entities present in such environment. In some embodiments, at least a portion of the image data may be computer-generated.

In some embodiments, OS/XR framework 101 may be configured to provide drivers, e.g., a video capture driver, an audio capture driver, or any other suitable driver, or any combination thereof, to interface with sensors of user device 116. For example, OS/XR framework 101 may provide a video capture driver comprising any suitable combination of hardware or software to interface with sensor 114 (e.g., a camera comprising one or more image sensors) of user device 116 configured to capture images of an environment surrounding user device 116. In some embodiments, OS/XR framework 101 may provide an audio capture driver comprising any suitable combination of hardware or software to interface with sensor 115 (e.g., a microphone) configured to capture ambient audio of an environment surrounding user device 116. In some embodiments, the video capture driver may be configured to receive requests for image data (e.g., video or other imagery) from interposer application 103 or XR application 105. In some embodiments, the audio capture driver may be configured to receive requests for audio data (e.g., spoken voices or utterances or other audio data) from interposer application 103 or XR application 105. In some embodiments, the video capture driver or another driver may be configured to interface and receive sensor data from a depth sensor (or a Lidar sensor, or any other suitable sensor) of user device 116, and such data may be subjected to further processing in accordance with the techniques described herein.

At 106, the raw image data (and/or other suitable data) captured at 104 may be passed from OS/XR framework 101 to interposer application 103, which may receive the image data and/or other suitable data. At 108, interposer application 103 may determine whether a privacy descriptor specified in the user profile matches one or more regions of the current image data or other data obtained at 102, and if so, may apply a modification or transformation (e.g., an access transformation) to the raw image data or other data, either in whole or to a specific region or portion thereof. In some embodiments, interposer application 103 analyzes the captured scene (e.g., captured by a camera and/or depth sensor) on a frame-by-frame basis, identifying entities such as, for example, users, persons, animals, objects, or environments depicted in the image data and determining whether the one or more identified entities are on an access control list specified in the privacy preferences of the user profile of user 107. In some embodiments, interposer application 103 may modify the image data by removing the region corresponding to the privacy descriptor from the image data, obscuring the region, blacking out the region, and/or substituting other content for the region or otherwise altering the region. In some embodiments, modifying the image data may comprise generating and providing to XR application 105 a list of regions in the analyzed image, rather than the image data itself.

At 110, interposer application 103 may pass the modified image data (which may optionally include geometry tags or metadata representative of at least a portion of the captured environment) to XR application 105. For example, the modified image data may comprise one or more regions having been elided or caused to be omitted by interposer application 103, and such modification may occur prior to transmitting any image data to XR application 105.

At 112, the XR application may utilize the modified image data received from interposer application 103. For example, the XR application may be permitted access only to regions of the raw image data deemed non-sensitive and therefore not modified by interposer application 103. Such aspects may enable the systems described herein to provides a privacy model for XR applications in which privacy controls are associated with the contents of image regions or contents of other data requested by or to be transmitted to an XR application 105 associated with the user profile of user 107. In some embodiments, XR application 105 is prohibited from directly accessing data from the video capture driver, based on the privacy preferences specified in the user profile of user 107. For example, the interposer application may be in communication with OS/XR framework 101, and may instruct OS/XR framework 101 not to forward image data or other suitable data requested by or intended for XR application 105 to XR application 105, and instead may instruct OS/XR framework 101 to forward such data to interposer application 103, or interposer application 103 may be otherwise configured to intercept such data.

Figure 2A:
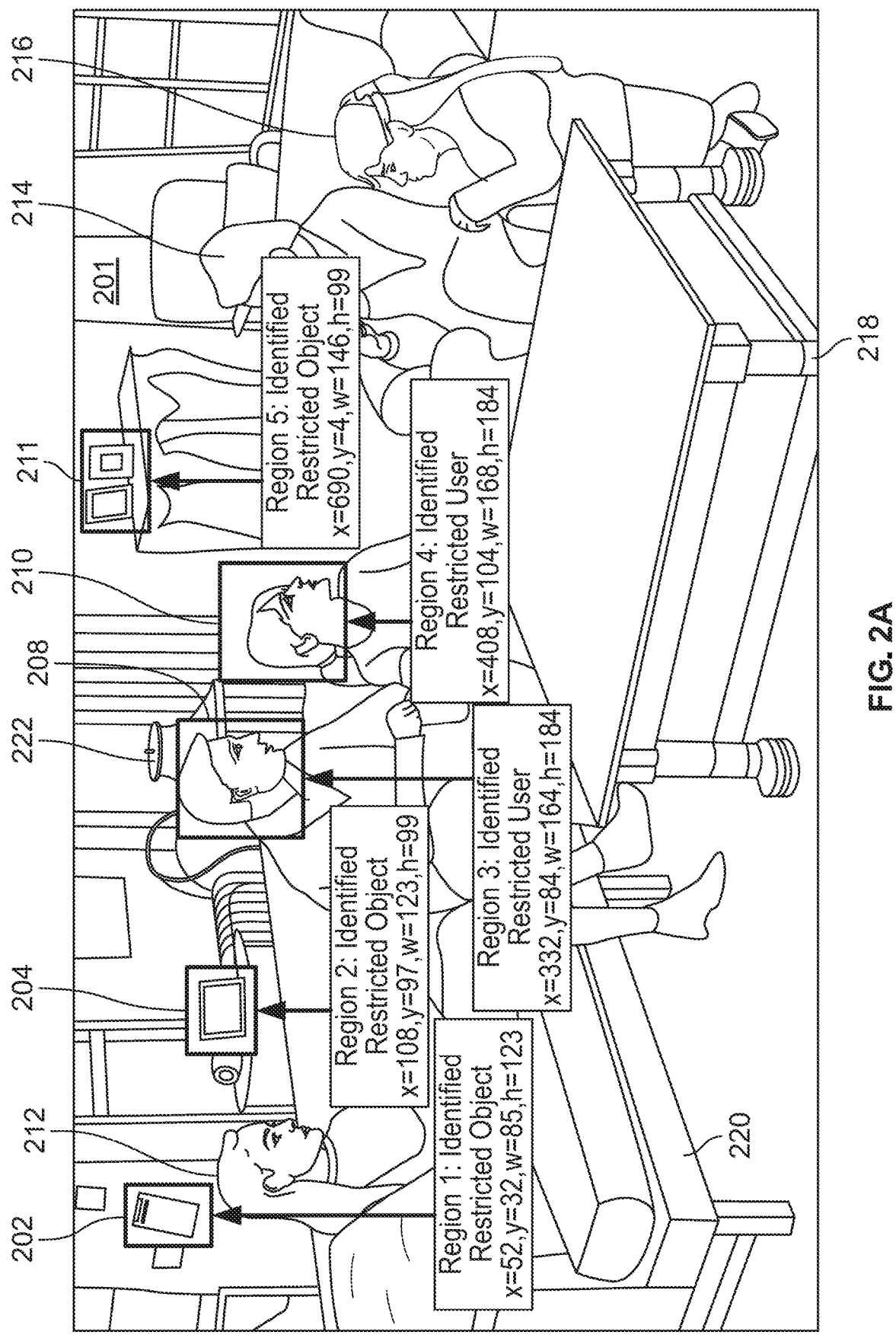
FIGS. 2A-2C show illustrative environments in which a system for controlling an extended reality application's access to image data may be implemented, in accordance with some embodiments of this disclosure.
Figure 2B:
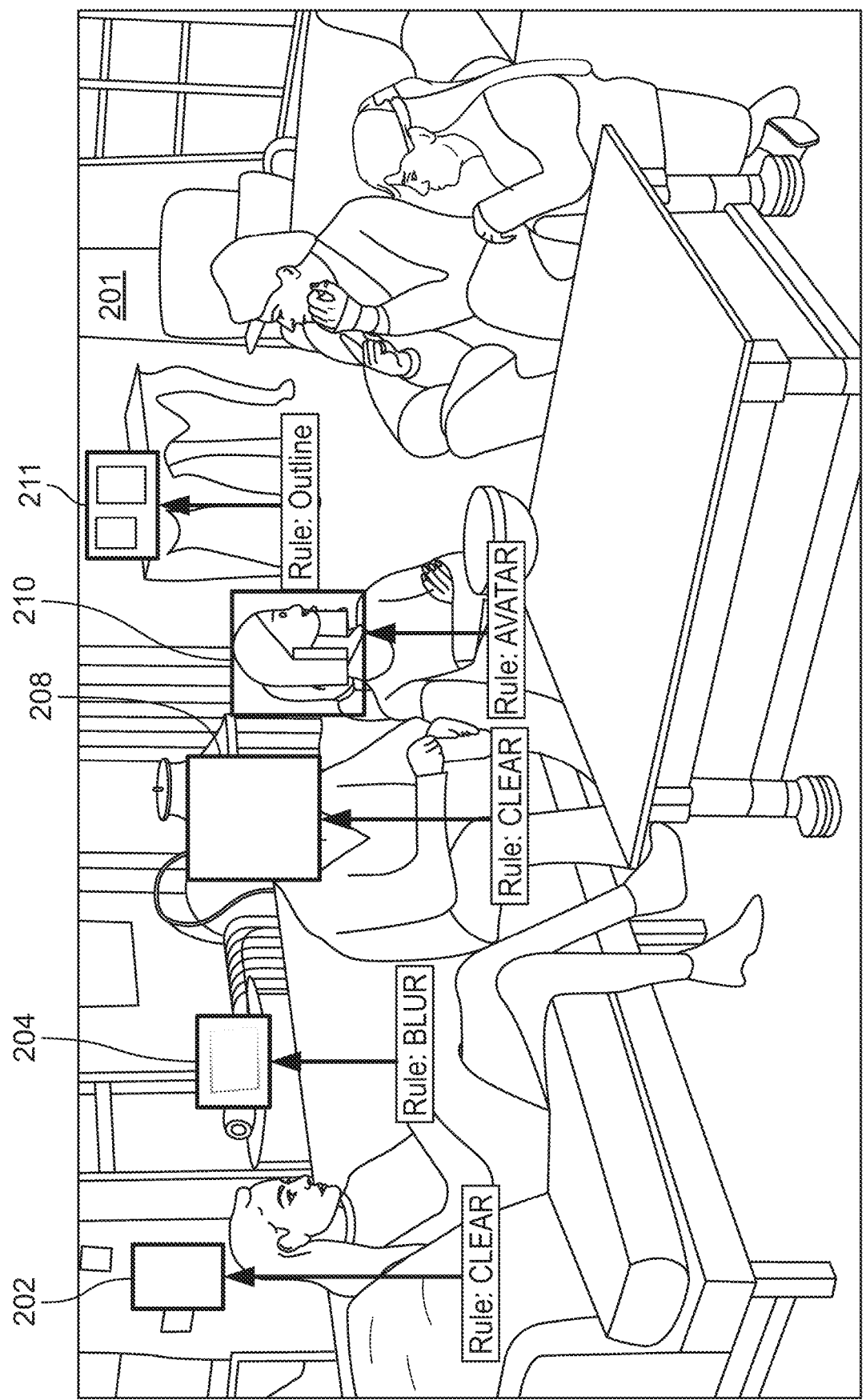
Figure 2C:
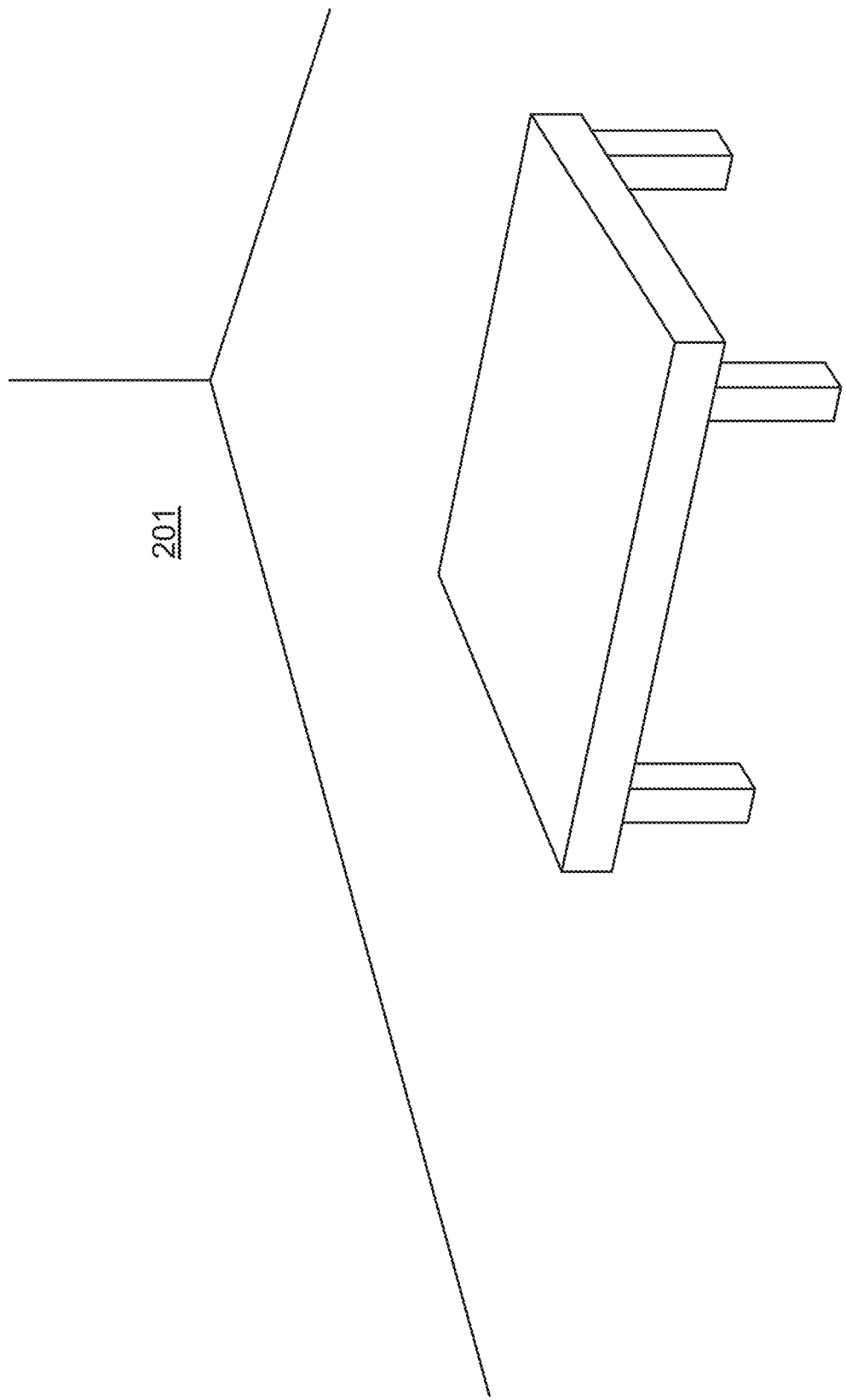

FIGS. 2A-2C show illustrative environments in which a system for controlling an extended reality application's access to image data may be implemented, in accordance with some embodiments of this disclosure. The interposer application may be configured to process the raw image data (e.g., received at 106) or other data passed from OS/XR framework 101 to the interposer application using any suitable computer-implemented technique. For example, the interposer application may employ image segmentation (e.g., semantic segmentation and/or instance segmentation) and classification to identify and localize different types or classes of objects or entities in frames captured by sensor 114. In the example of FIG. 2A, such segmentation techniques may include determining which pixels or voxels belong to a depiction of restricted objects 202, 204 and 211, and which pixels or voxels belong to a depiction of restricted users 208 and 210. Such segmentation technique may include determining which pixels or voxels belong to a physical environment 201 surrounding the objects and users. Environment 201 may be a particular physical location (e.g., a household of user 107 of FIG. 1, a park or playground, a place of business, an industrial facility, a school, other organization, or any other suitable location, or any combination thereof). Environment 201 may comprise any suitable number and types of entities (e.g., persons, animals, objects, particular users or types thereof, or any other suitable observable entity or attribute thereof, or any combination thereof). In some embodiments, object detection or restricted objects, and subsequent processing, may be performed with respect to the entire environment 201, or in a field of view of a user (e.g., user 107, who may be utilizing smart glasses or an XR head-mounted display) within environment 201. In some embodiments, the interposer application may be configured to attempt to identify only objects or users or other entities that are indicated as restricted based on the user profile.

In some embodiments, the interposer application may determine which pixels or voxels of the captured frame should be mapped to a particular facial feature (e.g., head, nose, ears, eyes, shoulder, mouth, etc.) or any other suitable feature of user 208 or 210. While the example of FIG. 2A shows the interposer application identifying objects 202, 204 and 211 and users 208 and 210 as restricted objects or users based on privacy preferences of a particular user profile, in some embodiments, the interposer application may be configured to identify all objects and users in environment 201, regardless of whether such objects or users are restricted. For example, the interposer application may additionally identify users 212, 214 and 216 and/or any suitable number of other users in environment 201, and may additionally identify objects 218, 220 and 222 and/or any suitable number of other objects in environment 201. In identifying and determining the location of objects or users in environment 201, the interposer application may identify a shape of, and/or boundaries (e.g., edges, outline, border) at which depictions of such users or objects end and/or analyze pixel or voxel intensity or pixel or voxel color values contained in the captured frame(s). In some embodiments, at least a portion of object recognition (e.g., recognition of common objects or planar surfaces) may be performed by the XR framework instead of or in conjunction with object recognition performed by the interposer application.

The interposer application may label pixels or voxels as belonging to a particular object or user or the physical background and determine the coordinates (e.g., x and y components and width and height components, and in the case of 3D content, a z component) of such object or user, to determine where modification of restricted users or objects should be performed in the captured frame(s). For example, the interposer application may employ machine learning, computer vision, object recognition, pattern recognition, facial recognition, image processing, image segmentation, edge detection, or any other suitable technique or any combination thereof. Additionally or alternatively, the interposer application may employ color pattern recognition, partial linear filtering, regression algorithms, and/or neural network pattern recognition, or any other suitable technique or any combination thereof. Any suitable annotation or mechanism may be utilized (e.g., a masking techniques or a bounding box or other bounding shape) to define a location of one or more users, objects or entities in each captured frame (or across multiple frames). In some embodiments, locations and/or classifications and/or identities one or more indications of an object or entity or user in a captured frame may be specified in metadata received by or generated by the interposer application.

In some embodiments, the interposer application may be configured to track motion of users, objects or entities from frame to frame, to accurately localize the entity in each frame, and maintain continuity of one or more modifications across frames. For example, the interposer application may take into account motion of restricted user 208 over time to maintain the modification of restricted user 208 across frames. In some embodiments, this may be performed by comparing image frames of video to reveal motion over a period of time, e.g., if the video is captured in 30 frames per second, each of the 30 frames may be analyzed to determine if there is motion in each or any of the frames. In some embodiments, motion vectors may be generated that describe an amount of motion with respect to consecutive captured frames.

In some embodiments, the interposer application may utilize any suitable number or types of image processing techniques to identify objects depicted in frames and images captured by one or more cameras associated with user device 116 and cameras associated with a user device of other session participants. In some embodiments, the interposer application may utilize one or more machine learning models (e.g., naive Bayes algorithm, logistic regression, recurrent neural network, convolutional neural network (CNN), bi-directional long short-term memory recurrent neural network model (LSTM-RNN), or any other suitable model, or any combination thereof) to localize and/or classify objects in the environment. For example, the machine learning model may output a value, a vector, a range of values, any suitable numeric representation of classifications of objects, or any combination thereof indicative of one or more predicted classifications and/or locations and/or associated confidence values. In some embodiments, the classifications may be understood as any suitable categories into which objects may be classified or characterized. In some embodiments, the model may be trained on a plurality of labeled image pairs, where image data may be preprocessed and represented as feature vectors. For example, the training data may be labeled or annotated with indications of locations of multiple entities and/or indications of the type or class of each entity.

As another example, the interposer application may extract one or more features for a particular object and compare the extracted features to those stored locally and/or at a database or server storing features of objects and corresponding classifications of objects. For example, if dimensions, shape, color, or any other suitable information, or any combination thereof, is extracted from one or more images of object 211, the interposer application may determine object 211 corresponds to a picture frame based on a similarity between the extracted information and stored information. In some embodiments, a Cartesian coordinate plane is used to identify a position of an object in environment 201, with the position recorded as (X, Y) coordinates on the plane. In some embodiments, the coordinates may include a coordinate in the Z-axis, to identify a depth of each identified object in 3D space, based on images captured using 3D sensors and any other suitable depth-sensing technology. In some embodiments, coordinates may be normalized to allow for comparison to coordinates stored at the database in association with corresponding objects. As an example, the interposer application may specify that an origin of the coordinate system is considered to be a corner of a field of view within or corresponding to environment 201. The position of the object may correspond to the coordinates of the center of the object or one or more other portions of the object.

Additionally or alternatively, the interposer application may utilize or be in communication with any suitable number and types of sensors to determine information related to the entities in environment 201. For example, such one or more sensors may be an image sensor, ultrasonic sensor, radar sensor, LED sensor, LIDAR sensor, or any other suitable sensor, or any combination thereof, to detect and classify objects in environment 201. One or more sensors of user device 116 of FIG. 1 may be used to ascertain a location of an object by outputting a light or radio wave signal, and measuring a time for a return signal to be detected and/or measuring an intensity of the returned signal. In some embodiments, the interposer application may be configured to receive input from user 107 identifying a location and/or classification of a particular entity.

In some embodiments, one or more devices and/or one or more objects in environment 201 may be configured to communicate wirelessly, as part of detecting objects or users in environment 201. For example, a device (e.g., user device 116 or any other suitable device) associated with user 107, a device associated with any other suitable user, and/or an Internet of Things (IoT) device (e.g., a smart lamp or any other suitable object) may be equipped with sensors (e.g., a camera or image sensor, a microphone, or any other suitable sensors or any combination thereof) and/or other circuitry (e.g., wireless communication circuitry). Such sensors may be used to indicate to the interposer application a location of an object, user or entity within environment 201 and/or an indication that an entity is of a particular type (e.g., a lamp or any other suitable household appliance). For example, such IoT devices may communicate with the interposer application via the Internet or directly, e.g., via short-range wireless communication or a wired connection. The interposer application may transmit identifiers indicative of an object type (e.g., whether the device is a chair, table, robot vacuum, exercise equipment, thermostat, security camera, lighting system, dishwasher, or any other suitable device, or any combination thereof) and/or an orientation and location of the object. The interposer application may build an inventory of objects (e.g., indications of locations and corresponding classifications of household items, or any other suitable objects, or any combination thereof) and corresponding locations of the objects in environment 201. Such inventory and corresponding location may be stored in association with one or more of the data structures (e.g., stored at a user device and/or server 604 and/or database 605 of FIG. 6 or any other suitable device or database). The interposer application may generate a data structure for a current field of view of the user, including object identifiers associated with objects in environment 201, and such data structure may include coordinates representing the position of the field of view and objects in environment 201.

In some embodiments, user device 116 and any other suitable devices, networking equipment (e.g., a router, a modem, a switch, an access point, or any other suitable device or any combination thereof), and/or any suitable IOT device, may be equipped with antennas for transmitting and receiving electromagnetic signals. Such signals may be transmitted and received at frequencies within the electromagnetic spectrum, e.g., radio frequencies, to communicate with each other over a network in a localized area. The network may correspond to, e.g., a Wi-Fi network, such as, for example, 802.11n, 802.11ac, 802.11ax, or Wi-Gig/802.11ad, or any other suitable network, or any combination thereof. The devices or objects of environment 201 may communicate wirelessly over a wireless local area network (WLAN) and with the Internet, and may be present within an effective coverage area of the localized network, e.g., a home network or enterprise network. The Internet may include a global system of interconnected computer networks and devices employing common communication protocols, e.g., the transmission control protocol (TCP), user datagram protocol (UDP) and the Internet protocol (IP) in the TCP/IP Internet protocol suite. In some embodiments, the objects and devices of environment 201 may communicate via a short-range wired or wireless communication technique (e.g., Bluetooth, RFID, NFC, or any other suitable technique, or any combination thereof). In some embodiments, the interposer application may identify classifications and/or locations of objects in environment 201 based on determined wireless signal characteristics, e.g., channel state information (CSI), received signal strength indicator (RSSI) and/or received channel power indicator (RCPI). Such aspects are discussed in more detail in Doken et al., application Ser. No. 17/481,931 filed Sep. 22, 2021, the contents of which are hereby incorporated by reference herein in their entirety.

As shown in FIG. 2B, as the interposer application may, based on evaluating privacy descriptors for a particular user profile, identify a set of regions that contain content that matches the reference objects and/or preferences it has been supplied with, e.g., entered via the graphical user interface (GUI) of FIGS. 3A-3C, and stored in association with the user profile, as shown in FIG. 4. Upon identifying objects and/or users and/or other entities within environment 201, the interposer application may retrieve privacy preferences of a user (e.g., user 107 of FIG. 1) associated with the XR application to which image data is to be transmitted. For example, privacy preferences may be retrieved based on user 107 having accessed or requested to access the XR application, or the XR application may be running in the background and/or requesting access to the image data, or any other suitable captured data, of environment 201. The interposer application may determine the matched regions and their coordinates, and the type of content (e.g., a user, a particular user, an object or a particular object) having been matched and identified based on the user's privacy preferences. Once restricted regions have been identified based on the privacy descriptors in the user's profile, the interposer application may be configured to apply access transformations to regions corresponding to such descriptors, and in a manner based on such descriptors.

In some embodiments, the interposer application may be configured to apply modifications to one or more regions of the image data that comprises sensitive content. For example, the interposer application may modify the depiction of object 202 (e.g., a financial document, valuable heirloom jewelry, a monthly calendar or other sensitive document) to clear or remove or elide all image data corresponding to object 202 from the image data of the environment. As another example, the interposer application may modify the depiction of object 204 (e.g., a family photograph) to blur or otherwise obscure object 204 from the image data of the environment. As another example, the interposer application may modify the depiction of user 208 to clear or remove the face of user 208 (or to modify any other suitable body part of the whole body of the user, from the image data). As another example, the interposer application may modify the depiction of user 210 to "cartoonify" the face of user 210, e.g., cause the face or body or other body part (or any combination thereof) of user 210 to be changed from a real-world representation to an avatar or cartoon version of the user (e.g., that mimics the facial features of user 208) or an emoji or memoji or other animated image or any combination thereof. In some embodiments, the avatar or cartoon may be oriented and scaled to the original head or body position and may track the user's movement from frame to frame. In some embodiments, the avatar or memoji or other avatar-type character may be generated by the interposer application or received from another source. For example, avatars may be application-specific, such as for different XR applications that are to receive the modified image data.

As another example, the interposer application may be configured to modify the depiction of object 211 (e.g., a family photograph) to provide only an outline of object 211 or otherwise obscure object 211 from the image data. The interposer application may apply such modifications to regions of the image data determined, based on the above-described processing, to correspond to coordinates of the restricted users or objects. Any suitable type of modification may be applied to regions of the image data by the interposer application, e.g., blurring or substituting image data, or returning to the application a list of regions in the analyzed image, rather than the image itself, or altering other characteristics of the image data corresponding to the object or other objects, or any other suitable modification, or any combination thereof. In some embodiments, an option may be provided to cause an option for a user or object to be removed from the image data such that after modification, there is no indication that such user or object is present in environment 201. For example, portions of user 208 proximate to the couch may be replaced with image data similar to the couch, and other portions of user 208 may be replaced to blend into environment 201, such that an observer of the modified image data may be under the impression that user 208 is not there and that users 212 and 210 are the only users sitting on the couch at the left-hand portion of FIG. 2B.

In some embodiments, such as, for example, shown in FIG. 2C, the interposer application may be configured to perform even more dramatic transformations. For example, it may be desirable (e.g., in a very sensitive location) for the interposer application to substantially or completely elide all information from the captured frame with the exception of an outline representing the basic geometry of the environment, based on a place privacy descriptor. This may be understood as a global access transformation applied to the entire image or substantially all of the image. Such a restriction may allow the XR application to render XR content (e.g., a game or any other suitable content) on walls, tabletops and/or other suitable surfaces, without giving the XR application access to any of the raw image data or only giving the XR application access to a fraction of the raw image data.

In some embodiments, after the interposer application applies such modifications to the image data (or other suitable data), e.g., modifies one or more regions of the image data corresponding to one or more of the users, objects or entities associated with the user's privacy preferences, the interposer application may provide the modified image data to one or more XR applications. For example, the modified data may be provided based on the user having requested to access the XR application, and the XR application may in turn communicate with the interposer application and/or the OS/XR framework 101 to request image data or other suitable data. The XR application may render content based on the modified image data and supplemented by XR content or otherwise use the modified image data to provide an XR experience to the user. Such provision of the modified image data to the XR application may enable controlling the XR application's access to data based on fine-grained privacy controls associated with the contents of image regions, rather than simply an all-or-nothing privacy model.

FIGS. 3A-3C show illustrative graphical user interfaces (GUIs), in accordance with some embodiments of this disclosure. In some embodiments, the privacy descriptors may be created or specified by a user using via one or more of the graphical user interfaces shown in FIGS. 3A-3C, or via a software agent that may generate the privacy descriptors based on a high level description. In some embodiments, the GUIs may comprise icons representing certain people, users, objects, places or other entities, such as, for example, with checkmarks or selectable options or any other suitable GUI element for specifying or indicating whether a given application should or should not be allowed access, and if such application should be allowed access, one or more conditions under which such access may be permitted.

Additionally or alternatively, the interposer application may provide, or be in communication with, a digital voice assistant (e.g., a smart speaker or home assistant or other suitable voice assistant) running on a platform (e.g., an OS of user device 116). For example, the interposer application may receive a voice input, and/or generate or receive a transcription of the voice input. As an example, the voice input may be "Don't let applications capture pictures of my kids" or "This room is off-limits to Facebook." The interposer application or other suitable application (e.g., OS/XR framework 101) may be configured to process and resolve the voice input and set or update the privacy preferences of the user profile based on the voice input. In some embodiments, such as if the voice input references a location as in "This room is off-limits to Facebook," the location of the voice assistant device receiving the voice input or location of the user uttering the voice input or location of user device 116 of FIG. 1 may be determined to identify which room is being referenced by the voice input, to implement the requested privacy preference. In some embodiments, privacy descriptors may be learned (e.g., via one or more machine learning techniques, or heuristics, or any other suitable computer-implemented techniques, or any combination thereof) from example or training data and historical privacy descriptor choices of a particular user or other users (e.g., similarly situated users sharing certain characteristics). In some embodiments, the learned privacy descriptors or privacy parameters may be tailored to a particular user profile and recommended to the user profile for selection, or automatically implemented. For example, the interposer application may provide privacy preference templates having parameters and settings tailored to specific user profiles and/or tailored to the identity of specific XR applications or types of XR applications.

As shown in FIG. 3A, GUI 301 may provide options for configuring privacy preferences for XR Application A, as shown at 302. In some embodiments, XR Application A indicated at 302 may correspond to XR application 105 of FIG. 1. GUI 301 may comprise option 304 to enable a user to specify that the privacy preferences for XR Application A, as specified at GUI 301, should be applied to all other XR applications installed on a particular device and/or otherwise associated with the user's profile. In some embodiments, GUI 301 may provide the user with the ability to select a subset of such XR applications for which the settings of XR Application A is to be applied. In the example of FIG. 3A, the interposer application receives selection of option 305 ("No"), and thus the preferences specified via GUI 301 may not be applied to other applications. On the other hand, if the interposer application receives selection of option 303 ("Yes"), the preferences specified via GUI 301 may be applied to one or more other XR applications in addition to XR Application A.

GUI 301 may comprise option 306 concerning whether direct access to all image data captured by a video capture driver associated with sensor 114 should be granted to XR Application A specified at 302. In some embodiments, if option 307 is selected, XR application A may be permitted to directly access data from the video capture driver, e.g., bypassing the interposer application. For example, if option 307 is selected, the remainder of the options provided by GUI 301 may be removed or grayed out, since providing direct access to the data by the XR application may render the other options irrelevant. On the other hand, if the interposer application receives selection of option 309, the XR Application A may not be permitted to directly access data from the video capture driver, e.g., all image data captured by the video capture driver and intended for or requested by the XR Application A may be transmitted to the interposer application for processing and performing modifications on the image data prior to providing the data to XR Application A. GUI 301 may provide option 308 concerning whether access to certain modified image data, e.g., after modification by the interposer application, should be granted to XR Application A, where an affirmative selection may be selected via option 311 and a negative selection may be entered via option 313. If option 313 is selected, XR Application A may be denied access to any image data of the video capture driver.

GUI 301 may further comprise, e.g., provided affirmative option 311 is selected, option 310 regarding whether XR Application A should be permitted to access certain modified image data associated with Object A (e.g., object 202 in FIG. 2A-2B). If option 315 is selected, the interposer application may determine to provide unmodified portions of the image data corresponding to Object A to XR Application A, subject to one or more conditions. For example, an option may be provided for the user to specify that unmodified image data of Object A may only be accessed at certain times of the day or times of the week or times of the year, or only if the object is not in a particular location within the home or other environment. If option 317 is selected, the interposer application may further prompt the user at GUI 301 or at GUI 331 of FIG. 3B to indicate a manner in which Object A should be modified by the interposer application and/or other settings (e.g., particular times of day or days of the week or times of year or particular locations(s) of Object A that the XR Application A should be permitted to access a modified version of Object A). While GUI 302 shows options with respect to a single object in a particular environment (e.g., a home of User A), it should be appreciated that similar options can be presented for any suitable number of objects in a particular environment, e.g., for all objects identified during object recognition, for certain objects flagged by the interposer application as potentially sensitive, and/or for objects specified by the user.

GUI 301 may further comprise option 312 regarding whether unmodified access to image data of a user (e.g., user 208 of FIG. 2A-2B) should be permitted for XR Application A. In some embodiments, User B may be a child of User A (or a house guest of User A), and User A may desire that no access to image data of his or her child (or house guest) should be passed to XR Application A and thus may select negative option 321. If option 321 is selected, the interposer application may further prompt the user at GUI 301 or at GUI 331 of FIG. 3B to indicate a manner in which User B should be modified by the interposer application and/or other settings (e.g., particular times of day or days of the week or times of year or particular locations(s) of Object A during or at which the XR Application A should be permitted to access a modified version of Object A). On the other hand, if option 319 is selected, the interposer application may provide further options (e.g., options 314 and 316) since there may be at least some circumstances in which User A does not mind if XR Application A receives unmodified image data of user B. In some embodiments, the interposer application may identify any user below a certain height or weight or having body size dimensions below a certain size as likely to be a child and may prompt User A to specify privacy settings for such user. In some embodiments, the interposer application may identify User B as a child of User A based on comparing image data of User B to a stored image, or may identify User B as a guest of User A based on comparing facial or other characteristics of the guest user to user profiles associated with the household.

GUI 301 may further comprise option 314 prompting User A to select which room(s) or other portions of the environment at which XR Application A is to be permitted access to unmodified image data of user B. For example, if selection of option 325 is received by the interposer application, the XR Application A may be permitted to access (e.g., via the interposer application or bypassing the interposer application) unmodified image data of User B captured in the living room of the home, but the absence of a selection of option 323 may cause XR Application A to be denied access to unmodified image data of User B when User B is determined to be in his or her bedroom. For example, the interposer application may modify any image data associated with User B in accordance with settings specified at GUI 331 of FIG. 3B. In some embodiments, any suitable number of rooms or locations within a particular environment may be specified in connection with option 314, e.g., image data of any users or individual users in any bathroom or any bedroom or other areas considered sensitive (as opposed to a more public area of the environment) may be blocked or otherwise modified. For example, User A may wish to disable capture in such certain sensitive areas in the home. In some embodiments, User A may be provided with an option to fully exclude capture and transmission of a particular person's image (e.g., his or her child's image) for a particular XR application, or globally across all XR applications.

GUI 301 may further comprise option 316 prompting User A to select time(s) during which access to unmodified image data of User B is permitted. For example, if selection of option 327 is received by the interposer application, the XR Application A may be permitted to access (e.g., via the interposer application or bypassing the interposer application) unmodified image data of User B from 9 AM-5 PM, provided User B is determined to be located in a room or location deemed permissible by option 314 for unmodified image data. However, the absence of a selection of option 329 may cause the interposer application to block or otherwise modify image data corresponding to User B during the hours of 5 PM-9 AM, regardless of the location of the user B. Option 318 may be selectable to cause the interposer application to implement the settings specified via GUI 301, while selection of option 320 may cancel any settings or preferences specified via GUI 301. In some embodiments, one or more GUIs similar to GUI 301 may be provided for a plurality of different environments, to enable a user to specify privacy preferences for various environments.

As shown in FIG. 3B, GUI 331 may provide options for configuring privacy preferences for XR Application A, as shown at 332. In some embodiments, XR Application A indicated at 302 may correspond to XR application 105 of FIG. 1. GUI 331 may comprise option 334 to enable a user to specify that the privacy preferences for XR Application A, as specified at GUI 331, should be applied to all other XR applications installed on a particular device and/or otherwise associated with the user's profile. In some embodiments, GUI 331 may provide the user with the ability to select a subset of such XR applications for which the settings of XR application A are to be applied. In the example of FIG. 3B, the interposer application receives selection of option 335 ("No"), and thus the preferences specified via GUI 331 may not be applied to other applications. On the other hand, if the interposer application receives selection of option 333, the preferences specified via GUI 331 may be applied to one or more other XR applications in addition to XR Application A. In some embodiments, any suitable combination of FIGS. 3A, 3B and 3C may be provided in a single GUI, or across multiple GUIs, and the options and manner of selecting the options may be presented in any suitable format.

As shown at 337, GUI 331 may enable User A to specify a manner in which modifications or access transformations to users or objects specified at GUI 331 should be performed, based on certain privacy descriptors. Depending on user preferences, a variety of transformations of visual content may be appropriate. For example, some users may desire to completely "blank out" content regions containing children or other sensitive users or objects, while others may want to blur or otherwise obscure the scene just enough that facial detection software cannot be run on the scene. Others may want to "cartoonify" certain users. In some embodiments, for performing modifications to User B (e.g., associated with options 312, 314, 316 of FIG. 3A), GUI 331 may provide options 336, 338, 340, 342, 344, 346, or any other suitable options for any other suitable privacy descriptors, or any combination thereof. An affirmative selection of option 336 may cause the interposer application to cause the image of User B to be removed from the image data, e.g., whited out, blacked out, or removed such that the portions of User B in the image data blend into the environment, or any other suitable removal technique may be employed. An affirmative selection of option 338 may cause the interposer application to obscure the face of User B (e.g., as shown in FIG. 2B, the face of 208 may be whited out or otherwise obscured), and/or an affirmative selection of option 340 may cause the entire body of User B to be obscured. In some embodiments, GUI 331 may permit User A to specify that any suitable portion(s) of User B be removed from the image data.

GUI 331 may provide option 342 to cartoonify the entire body of user B. An affirmative selection of option 344 may cause the face of User B to be cartoonified, such as, for example, as shown at 210 of FIG. 2B. In some embodiments, GUI 331 may permit User A to specify that any suitable portion(s) of User B be cartoonified. GUI may provide option 346 which may cause the interposer application to render the face or body or portions thereof as an outline, e.g., with or without shading inside the borders of the outline. In some embodiments, processing may be performed to track the location of User B and continuously perform the selected modifications to portions of the image data corresponding to the updated position of user B.

GUI 331 may enable User A to specify a manner in which modifications to Object A (e.g., associated with option 311 at GUI 301) should be performed by the interposer application. GUI 331 may provide options 348, 350, 352, 354, or any other suitable options for any other suitable privacy descriptors, or any combination thereof. An affirmative selection of option 348 may cause Object A or portion(s) thereof to be removed from the image data, e.g., whited out, blacked out, or removed such that the portions of Object A in the image data blend in the environment, or any other suitable removal technique may be employed. An affirmative selection of option 350 may cause the interposer application to obscure Object A or portions thereof. An affirmative selection of option 352 may render Object A or portions thereof as an outline, e.g., with or without shading inside the borders of the outline. An affirmative selection of option 354 may cause a color (or texture, or size or shape or any other suitable characteristic of Object A) of Object A to be altered, or an option for any other suitable visual transformation may be provided.

GUI 331 may enable User A to specify a manner in which modifications to an environment (e.g., the home of user and/or any other suitable environment) should be performed. For example, GUI may provide options 356, 358, 360, 362, or any other suitable options for any other suitable privacy descriptors, or any combination thereof. An affirmative selection of option 356 may cause the interposer application to obscure the background or portions thereof (e.g., walls, ceilings, floors or other portions of the environment) of the image data. An affirmative selection of option 358 may cause the interposer application to completely elide the background, e.g., as shown in FIG. 2C. An affirmative selection of option 360 may cause the interposer application to replace the background with shapes (e.g., simple geometric shapes) or other content (e.g., a virtual background or any other suitable content). An affirmative selection of option 362 may cause removal of the entire background of the image data, e.g., behind detected objects, users and/or other entities. For example, the interposer application may not pass information related to the background to the XR application at all, and/or may only pass geometry metadata (e.g., flat surfaces or other geometry data). The examples of FIGS. 3A-3C may enable a set of user-supplied privacy policies to restrict access by the XR application to certain regions or contents of the image on a frame-by-frame basis, based on one or more of the particular XR application and contents of the scene.

In some embodiments, the interposer application may be configured to apply modifications to any suitable type of data, additionally or alternatively to image data. For example, as shown in FIG. 3C, GUI 363 may enable a user to specify preferences for audio data captured by one or more microphones in a particular environment (e.g., environment 201 of FIG. 2A). For example, some users may consider certain audio data to be highly sensitive, and may wish to prevent certain applications from capturing certain voices or sounds, or to prevent capture in certain locations. The interposer application may be supplied with a list of privacy descriptors, specified by way of GUI 363. In some embodiments, the privacy descriptors may comprise or be associated with certain templates that may enable the interposer application to identify certain voices of particular users or other sounds.

GUI 363 may provide options for configuring privacy preferences for XR Application A with respect to audio data, as shown at 339. In some embodiments, XR Application A indicated at 339 may correspond to XR application 105 of FIG. 1. GUI 363 may comprise option 341 to enable a user to specify that the privacy preferences for XR Application A, as specified at GUI 363, should be applied to all other XR applications installed on a particular device and/or otherwise associated with the user's profile. In some embodiments, GUI 363 may provide the user with the ability to select a subset of such XR applications for which the settings of XR application A is to be applied. In the example of FIG. 3C, the interposer application receives selection of ("No") in association with option 341, and thus the preferences specified via GUI 363 may not be applied to other applications. On the other hand, if the interposer application receives selection of "Yes" in connection with option 341, the preferences specified via GUI 363 may be applied to one or more other XR applications in addition to XR Application A.

GUI 363 may comprise option 343 concerning whether direct access to all audio data captured by an audio capture driver associated with sensor 115 should be granted to XR application A specified at 339. In some embodiments, if an affirmative selection of "Yes" associated with option 343 is selected, XR application A may be permitted to directly access data from the audio capture driver, e.g., bypassing the interposer application. For example, if such affirmative selection is received, the remainder of the options provided by GUI 301 may be removed or grayed out, since providing direct access to the data by the XR application may render the other options irrelevant. On the other hand, if the interposer application receives selection of a negative option associated with option 343, the XR application A may not be permitted to directly access data from the audio capture driver. For example, all audio data captured by the audio capture driver and intended for or requested by XR application A may be transmitted to the interposer application for processing and performing modifications on the audio data prior to providing the data to XR Application A.

GUI 363 may provide option 345 concerning whether access to certain modified image data, e.g., after modification by the interposer application, should be granted to XR Application A, where a negative selection in connection with option 345 may cause XR application A to be denied access to any audio data of the audio capture driver. GUI 363 may further comprise, e.g., provided an affirmative option is selected in connection with option 345, option 347 regarding whether XR application A should be permitted to access certain modified audio data associated with detected voices (e.g., of users in environment 201 of FIG. 2B). An affirmative selection associated with option 347 may enable all detected voices to be modified, e.g., based on the options selected at 353 and/or 355. A negative selection in association with object 347 may cause the interposer application to prompt the user to specify his or her preferences with respect to one or more users of the particular environment. For example, option 349 may be associated with a selection as to whether unmodified audio data of User B in the home should be passed to XR Application A. User A may desire to restrict access to the voice of User B, who may be a child or guest of User A, or any other suitable user. On the other hand, detected sounds, such as, for example, a dog barking as indicated by option 351, may be less concerning to the user, and User A may specify that unmodified access to a dog barking by XR application A is permitted. While options for User B and a dog barking are shown in the example of FIG. 3C, it should be appreciated that privacy preferences may be provided for specification at GUI 363 with respect to audio data for any suitable number of users (e.g., User A himself or herself, family members and friends of User A, a delivery person or service technicians entering the environment, or any other suitable users or any combination thereof), or for any other suitable animals or objects or detected sounds or other entities, or any combination thereof.

GUI 363 may provide option 353, and an affirmative selection of option 353 may cause audio information associated with specified users (e.g., user B) to be completely stripped out prior to passing such audio data to the XR application. An affirmative selection of option 355 may cause audio information associated with specified users (e.g., user B) to be modified such as to prevent speaker identification algorithms from being run on it, e.g., converted to a robotic voice. In some embodiments, a rule might exclude any children's voices from being passed to certain applications, while a different rule may exclude any audio that is determined or classified to be a voice. In some embodiments, the option may depend at least in part on the age of the user, e.g., audio data associated with users under a certain threshold age, such as, for example, 12, should be stripped out of the audio data, whereas audio data associated with users above the threshold age may be provided to the XR application unmodified or may be modified differently.

FIG. 4 shows an illustrative data structure, in accordance with some embodiments of this disclosure. As shown in data structure 400, the interposer application may store in association with a user profile (e.g., User A) privacy preferences and privacy descriptors specified by way of FIGS. 3A-3C. For example, data structure 400 may comprise column 402 specifying each managed XR application, column 404 specifying privacy preferences associated with image sensor(s) in the user's home (e.g., all image sensors in the home, or for specific devices), and column 406 specifying privacy preferences associated with microphone(s) in the user's home. The interposer application may reference the data structure when determining whether a particular XR application should be granted direct access to image data or audio data or any other suitable data captured in the particular environment or any combination thereof, and when determining which modifications or access transformations to be applied to users or objects or entities detected in data captured by the video capture driver, audio capture driver and/or any other suitable driver or sensor interface. Any suitable number of sensors and associated privacy preferences may be included in data structure 404 (e.g., an accelerometer, a depth sensor, a biometric sensor, or any other suitable sensor, or any combination thereof).

As shown in FIG. 4, access may be parameterized by XR application. For example, it may be desirable to grant XR Application B (e.g., a home inventory application designed to create an insurance record of the objects and rooms in a user's home) a greater degree of access than to a social media platform. As an example, XR Application B may be granted direct access to unmodified image data, but may not be granted direct access to all audio data, at least a portion of which may be superfluous to the intended purpose of XR Application B. As another example, a user may desire to grant a greater degree of access to XR applications that seem to be in alignment with the application's actual needs, e.g., an XR application that provides a game displaying characters on a tabletop may not require image data of users' faces in order to operate, for example, but may function better with access to image data of such tabletop. In some embodiments, the GUIs of FIGS. 3A-3C, and resulting data structure of FIG. 4, may request that a specific XR application or all XR applications refrain from displaying virtual objects in certain sensitive regions of the image, e.g., a user may restrict the ability of an application to display content in the region around and including a child's face.

In some embodiments, privacy descriptors specified by the privacy preferences for a particular user profile may be expressed in any number of formats, such as, for example, XML, JSON, executable code, or any other suitable format, or any combination thereof. An illustrative privacy descriptor is shown below:

(descriptor name="home inventory people restrictions",
application="Allstate AR Home Cataloger",
type="person",
match_data=<recognition template for a particular user in the home>,
access_transform=BLUR,
transform_area=REGION)

In this example, a privacy descriptor may have a name ("home inventory people restrictions"), an application that it applies to ("Allstate AR Home Cataloger," which may be an application that performs the home inventory function), and a type (in this case, "person," indicating that the privacy descriptor is specific to a given person in the home, rather than an object or a place). As shown above, match_data indicates the circumstances under which the image data is considered to "match" this template, e.g., whether a given user's face is in the template, or in the case of audio data, whether a certain voice or sound is in the template. In some embodiments, contents of the match_data field may be dependent on a type of the privacy descriptor. For example, in the case of a place privacy descriptor, which may be intended to transform the image data when the user is in a particular location, the match data may indicate a geofenced area, inside of which the transformation may be applied. In the case of a person or object privacy descriptor, the match data may be a recognition template that describes the visual characteristics of the person or object to which access will be restricted. The recognition template may take several forms. For example, a user may supply one or more pictures or the object or person, from which recognition parameters may be distilled, or the interposer application may use existing facial or object recognition classifiers to determine a match, and thus identify objects, users and/or other entities in the content of the image data to which there is to be restricted access.

The access_transform field may be applied if a match is detected, and may define how the image data or regions thereof are to be modified, e.g., if the match data for this descriptor indicates that sensitive content is in the image. The transform_area field may indicate how the access transformation is to be applied, e.g., the option "REGION" may indicate that the image modification is to be applied to a subset of the image data that contains sensitive content, or "GLOBAL" may indicate that the entire image is to be modified if sensitive data is contained in any part of the image data.

In some embodiments, all or substantially all of the features described herein may be performed locally on a user's XR device, e.g., the user may be permitted to configure privacy preferences on-device through some software settings interface, and the settings may be stored locally. In some embodiments, the interposer application may process each frame according to those preferences (which may be suggested by the system or derived from a learning process, and/or received through explicit user configuration via FIGS. 3A-3C).

In some embodiments, the interposer application may facilitate an opportunity for more centralized sharing of privacy preferences across devices and applications. For example, in addition to preventing XR applications running at the user device from accessing sensitive image data, the interposer application may be configured to prevent applications on other users' devices from accessing the sensitive image data. For example, privacy preferences and/or privacy descriptors may be stored at a central cloud service, e.g., maintained by an XR platform vendor or any other suitable entity. When an XR application is started on any device based on that platform, it may retrieve any relevant privacy descriptors from the cloud, which may include both that user's privacy descriptors as well as the privacy descriptors of other users, and such privacy settings may then be applied to the image (and/or other types of data) processing pipeline. For example, the interposer application may enable a privacy-conscious user to create a recognition template for his- or herself, such as in the form of a series of facial images, which may be uploaded to the cloud via a web interface that allows users to create shared privacy descriptors, allowing the user to indicate what should happen if any application captures that user in the camera frame. For example, a user may wish that no applications built using a particular platform should have access to that user's facial image, anywhere. Such centralized storage of many users' privacy descriptors may also provide a dataset for constructing recommendations for privacy suggestions, based on machine learning or other approaches. Such a system may be configured to generate "if this, then that"-style privacy recommendations based on analysis of many users' individual privacy choices. In some embodiments, such features may employ anonymous location-based sharing or other mechanisms to identify likely subjects for processing based on privacy preferences. In some embodiments, if a guest user attempts to capture or access image data associated with a particular location while located in the particular location associated with a profile of the interposer application, the guest user may be disallowed from doing so, or the privacy preferences of the profile may otherwise be applied to image data captured or accessed by the guest user.

In some embodiments, the system may proactively prompt the user for policy input, e.g., by asking a user what privacy restrictions should be associated with a new face or new object or other new entity that is detected in the image data that the camera is oriented towards (or is in a field of view of the user), or a new voice detected in the audio data, for a particular environment. For example, in such an instance, the user may be provided with a notification requesting the user to dynamically specify privacy preferences or suggesting privacy preferences based on the type of detected object or user and/or historical preferences of the user, and the interposer application may apply such preferences in real time after receiving specification or confirmation of the preferences to be applied.

A field of view may be understood as a portion of an environment (real or virtual or any suitable combination thereof) that is captured by a camera of a user device at a given time, and/or presented to the user at a given time by the user device (e.g., an angle in a 360-degree sphere environment, or any suitable number of degrees). In some embodiments, the field of view may comprise a pair of 2D images to create a stereoscopic view in the case of a VR device; in the case of an AR device (e.g., smart glasses), the field of view may comprise 3D or 2D images, which may include a mix of real objects and virtual objects overlaid on top of the real objects using the AR device (e.g., for smart glasses, a picture captured with a camera and content added by the smart glasses). If an XR environment has a single degree of liberty, e.g., a rotation of 360 degrees, any field of view may be defined by either the edge angular coordinates (e.g., +135 degrees, +225 degrees) or by a single angular coordinate (e.g., −55 degrees) combined with the known angular opening of the field of view. If an XR environment has six degrees of liberty, say three rotations of 360 degrees and three spatial positions, any field of view may be defined by three angular coordinates and three spatial coordinates. A field of view may therefore be understood as a portion of an environment displayed when the user is at a particular location in the environment and has oriented the display device in a particular direction.

In some embodiments, the interposer application may determine or receive information indicating one or more objects, users or entities to which a user's gaze is directed and/or whether the one or more objects, users or entities are in a field of view of a particular user. For example, upon determining that user gaze is directed to a particular region of a particular environment corresponding to the image data being captured by a user device associated with the user profile, image data corresponding to the particular region may be modified based on privacy preferences. For example, if the user's gaze is determined to be fixated on a particular user or object (e.g., a television), the image data region corresponding to the television may be modified based on the user's privacy preferences, or the image data regions corresponding to objects not in the user's gaze or field of view may be modified while the objects in the user's gaze or field of view may not be modified. In some embodiments, upon detecting a user gesture (e.g., pointing towards) an object or user or other entity, such object or user or other entity may be considered sensitive and privacy preferences may be applied thereto.

In some embodiments, the processes described herein may not interfere with simultaneous localization and mapping (SLAM) or other continuously running processes, as such processing may execute within the context of the XR Framework, which may maintain full access to cameras and/or other sensors. For example, application-layer access may be restricted by the interposer application.

Figure 5:
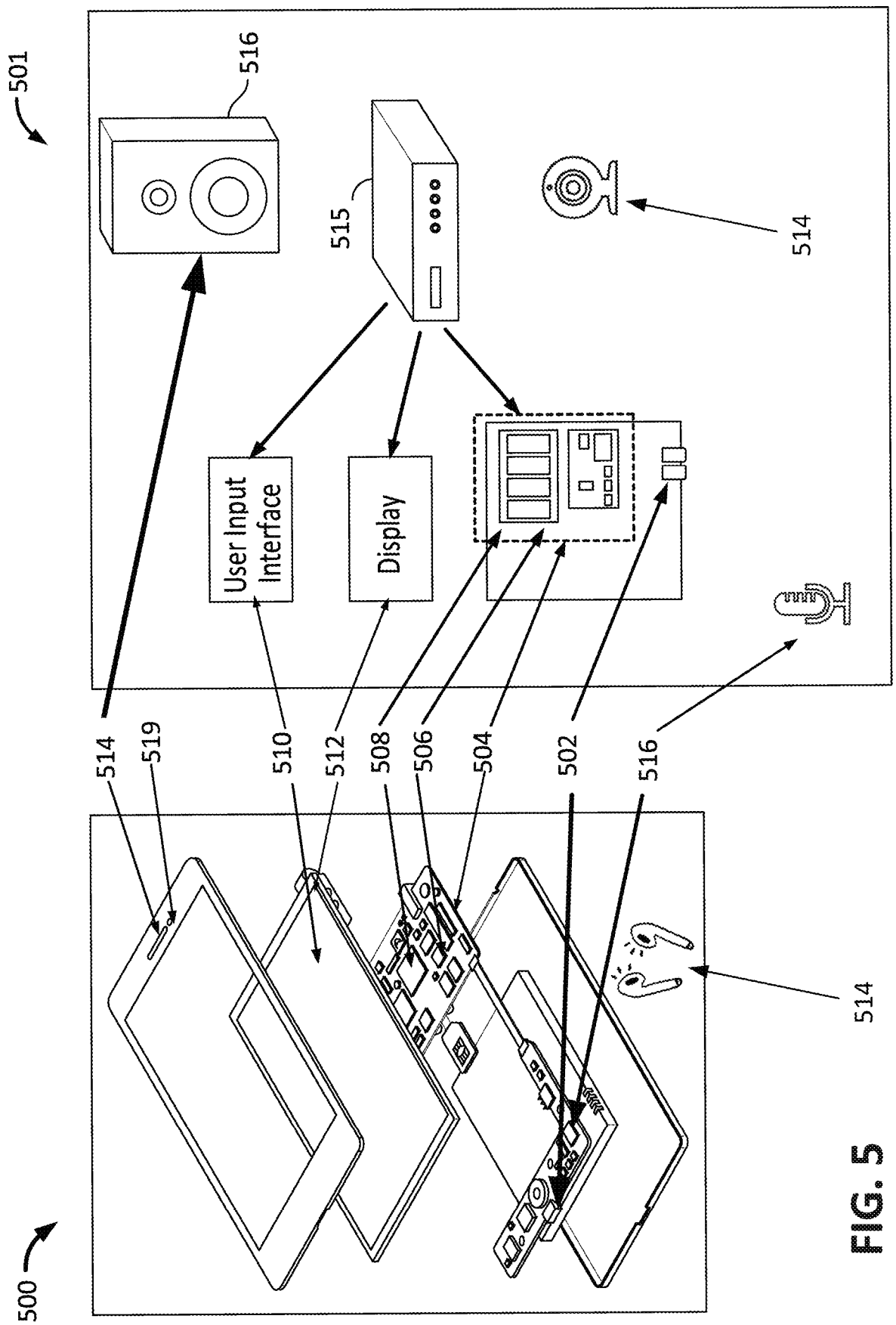
FIGS. 5-6 show illustrative devices, systems, servers, and related hardware for controlling an extended reality application's access to image data, in accordance with some embodiments of the present disclosure, in accordance with some embodiments of this disclosure.
Figure 6:
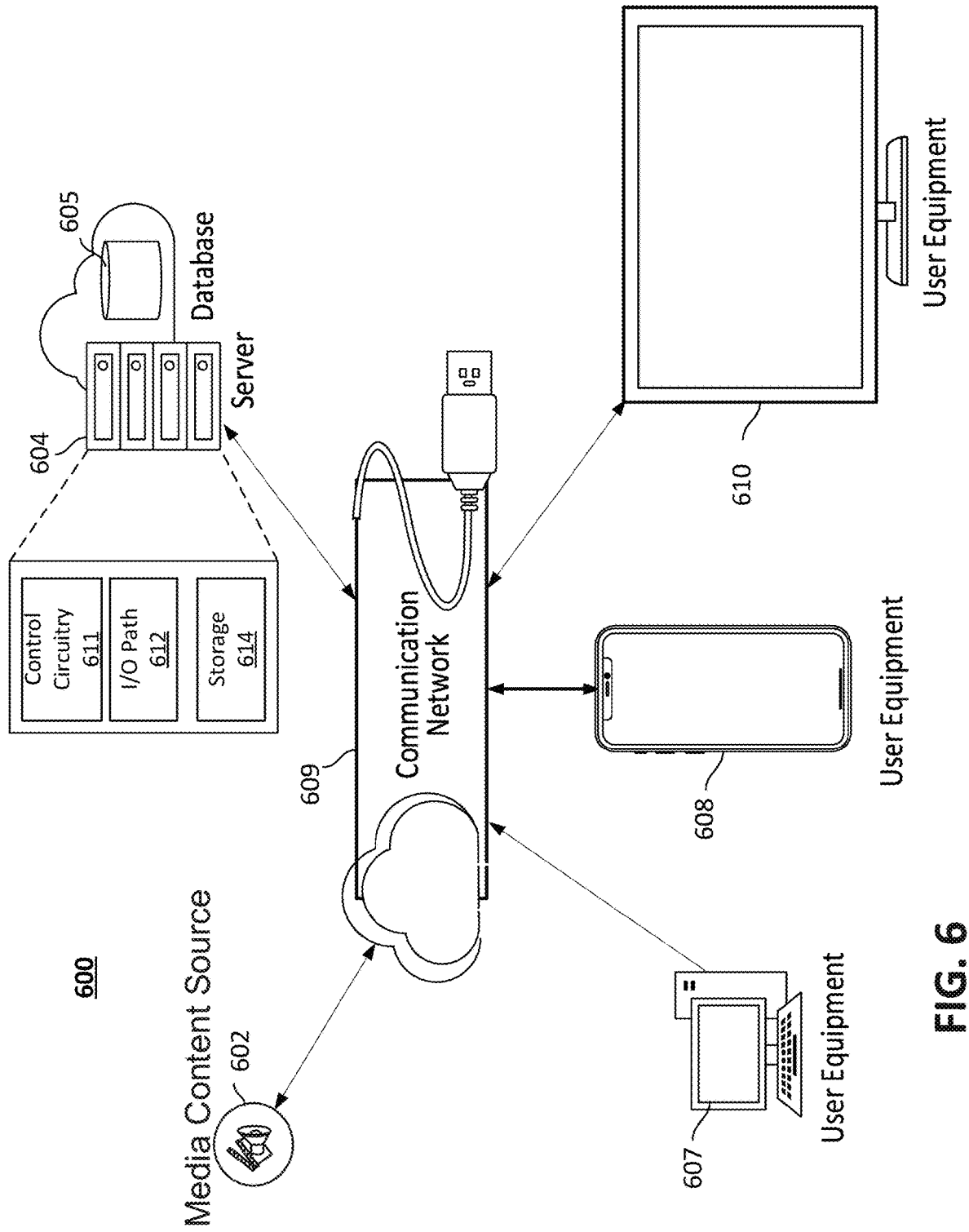

FIGS. 5-6 describe illustrative devices, systems, servers, and related hardware for controlling an extended reality application's access to image data, in accordance with some embodiments of the present disclosure. FIG. 5 shows generalized embodiments of illustrative user devices 500 and 501, which may correspond to, e.g., user device 116 of FIG. 1. For example, user device 500 may be a smartphone device, a tablet, a near-eye display device, an XR (e.g., virtual reality or augmented reality or mixed reality) device, or any other suitable device capable of participating in a video or other media communication session (e.g., in real time or otherwise) over a communication network. In another example, user device 501 may be a user television equipment system or device. User device 501 may include set-top box 515. Set-top box 515 may be communicatively connected to microphone 516, audio output equipment (e.g., speaker or headphones 514), and display 512. In some embodiments, microphone 516 may receive audio corresponding to a voice of a video conference participant and/or ambient audio data during a video conference. In some embodiments, display 512 may be a television display or a computer display. In some embodiments, set-top box 515 may be communicatively connected to user input interface 510. In some embodiments, user input interface 510 may be a remote control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user devices are discussed below in connection with FIG. 6. In some embodiments, device 500 may comprise any suitable number of sensors (e.g., gyroscope or gyrometer, or accelerometer, etc.), and/or a GPS module (e.g., in communication with one or more servers and/or cell towers and/or satellites) to ascertain a location of device 500. In some embodiments, device 500 comprises a rechargeable battery that is configured to provide power to the components of the device.

Each one of user device 500 and user device 501 may receive content and data via input/output (I/O) path 502. I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While set-top box 515 is shown in FIG. 5 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., device 500), an XR device, a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the interposer application stored in memory (e.g., storage 508). Specifically, control circuitry 504 may be instructed by the interposer application to perform the functions discussed above and below. In some implementations, processing or actions performed by control circuitry 504 may be based on instructions received from the interposer application.

In client/server-based embodiments, control circuitry 504 may include communications circuitry suitable for communicating with a server or other networks or servers. The interposer application may be a stand-alone application implemented on a device or a server. The interposer application may be implemented as software or a set of executable instructions. The instructions for performing any of the embodiments discussed herein of the interposer application may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of a device 500.

In some embodiments, the interposer application may be a client/server application where only the client application resides on device 500 (e.g., device 116 of FIG. 1), and a server application resides on an external server (e.g., server 604 and/or media content source 602). For example, the interposer application may be implemented partially as a client application on control circuitry 504 of device 500 and partially on server 604 as a server application running on control circuitry 611. Server 604 may be a part of a local area network with one or more of devices 500, 501 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 604 and/or an edge computing device), referred to as "the cloud." Device 500 may be a cloud client that relies on the cloud computing capabilities from server 604 to determine whether a particular portion of image data or audio data or any other suitable data matches a particular privacy preference and should be modified prior to providing such data to one or more XR applications. When executed by control circuitry of server 604, the interposer application may instruct control circuitry 611 to perform processing tasks for the client device and facilitate the video conference. The client application may instruct control circuitry 504 to determine whether a particular portion of image data or audio data or any other suitable data matches a particular privacy preference and should be modified prior to providing such data to one or more XR applications. In some embodiments, the video conference may correspond to one or more of online meetings, virtual meeting rooms, video calls, Internet Protocol (IP) video calls, etc.

Control circuitry 504 may include communications circuitry suitable for communicating with a server, edge computing systems and devices, a table or database server, or other networks or servers The instructions for carrying out the above mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user devices, or communication of user devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as interposer application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 504 may also include scaler circuitry for upconverting and downconverting content into the preferred output format of user 500. Control circuitry 504 may also include digital-to-analog converter circuitry and analog-to-digital converter circuitry for converting between digital and analog signals. The tuning and encoding circuitry may be used by user device 500, 501 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user device 500 and user device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of device 500 and device 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504. Camera 518 may be any suitable video camera integrated with the equipment or externally connected. Camera 518 may be a digital camera comprising a charge-coupled device (CCD) and/or a complementary metal-oxide semiconductor (CMOS) image sensor. Camera 518 may be an analog camera that converts to digital images via a video card.

The interposer application may be implemented using any suitable architecture. For example, it may be a stand-alone application wholly-implemented on each one of user device 500 and user device 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide video conferencing functionality and generate any of the displays discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 504 may allow a user to provide user profile information or may automatically compile user profile information. For example, control circuitry 504 may access and monitor network data, video data, audio data, processing data, participation data from a conference participant profile. Control circuitry 504 may obtain all or part of other user profiles that are related to a particular user (e.g., via social media networks), and/or obtain information about the user from other sources that control circuitry 504 may access. As a result, a user can be provided with a unified experience across the user's different devices.

In some embodiments, the interposer application is a client/server-based application. Data for use by a thick or thin client implemented on each one of user device 500 and user device 501 may be retrieved on-demand by issuing requests to a server remote to each one of user device 500 and user device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via input interface 510 and transmit those inputs to the remote server for processing and generating the corresponding displays. For example, device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to device 500 for presentation to the user.

In some embodiments, the interposer application may be downloaded and interpreted or otherwise run by an interpreter or virtual machine (run by control circuitry 504). In some embodiments, the interposer application may be encoded in the ETV Binary Interchange Format (EBIF), received by control circuitry 504 as part of a suitable feed, and interpreted by a user agent running on control circuitry 504. For example, the interposer application may be an EBIF application. In some embodiments, the interposer application may be defined by a series of JAVA-based files that are received and run by a local virtual machine or other suitable middleware executed by control circuitry 504. In some of such embodiments (e.g., those employing MPEG-2, MPEG-4, HEVC or any other suitable digital media encoding schemes), interposer application may be, for example, encoded and transmitted in an MPEG-2 object carousel with the MPEG audio and video packets of a program.

FIG. 6 is a diagram of an illustrative system 600 for enabling user-controlled extended reality, in accordance with some embodiments of this disclosure. User devices 607, 608, 610 (which may correspond to, e.g., user device 116 of FIG. 1) may be coupled to communication network 609. Communication network 609 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 609) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between user devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user devices may also communicate with each other directly through an indirect path via communication network 609.

System 600 may comprise media content source 602, one or more servers 604, and/or one or more edge computing devices. In some embodiments, the interposer application may be executed at one or more of control circuitry 611 of server 604 (and/or control circuitry of user devices 607, 608, 610 and/or control circuitry of one or more edge computing devices). In some embodiments, the media content source and/or server 604 may be configured to host or otherwise facilitate video communication sessions between user devices 607, 608, 610 and/or any other suitable user devices, and/or host or otherwise be in communication (e.g., over network 609) with one or more social network services.

In some embodiments, server 604 may include control circuitry 611 and storage 614 (e.g., RAM, ROM, Hard Disk, Removable Disk, etc.). Storage 614 may store one or more databases. Server 604 may also include an input/output path 612. I/O path 412 may provide video conferencing data, device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise I/O circuitry. I/O path 612 may connect control circuitry 611 (and specifically control circuitry) to one or more communications paths.

In some embodiments, user devices 607, 608, and 610 may comprise device drivers, e.g., a video capture driver, an audio capture driver, or any other suitable driver, or any combination thereof, to interface with sensors of user device 116. For example, the video capture driver may comprise any suitable combination of hardware or software to interface with an image sensor configured to capture images of an environment surrounding user devices 607, 608, and 610. In some embodiments, the audio capture driver may comprise any suitable combination of hardware or software to interface with a microphone configured to capture ambient audio of an environment surrounding user devices 607, 608, and 610. In some embodiments, the video capture driver may be configured to receive requests for image data (e.g., video or other imagery) from interposer application 103 or XR application 105 or interposer application 103 may intercept such request from XR application 105. In some embodiments, the audio capture driver may be configured to receive requests for audio data (e.g., spoken voices or utterances or other audio data) from interposer application 103 or XR application 105 or interposer application 103 may intercept such request from XR application 105. In some embodiments, the video capture driver or another driver may be configured to interface and receive sensor data from a depth sensor (or a Lidar sensor, infrared sensor, or any other suitable sensor) of user devices 607, 608, and 610, and such data may be subjected to further processing in accordance with the techniques described herein.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 411 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for an emulation system application stored in memory (e.g., the storage 614). Memory may be an electronic storage device provided as storage 414 that is part of control circuitry 611.

Figure 7:
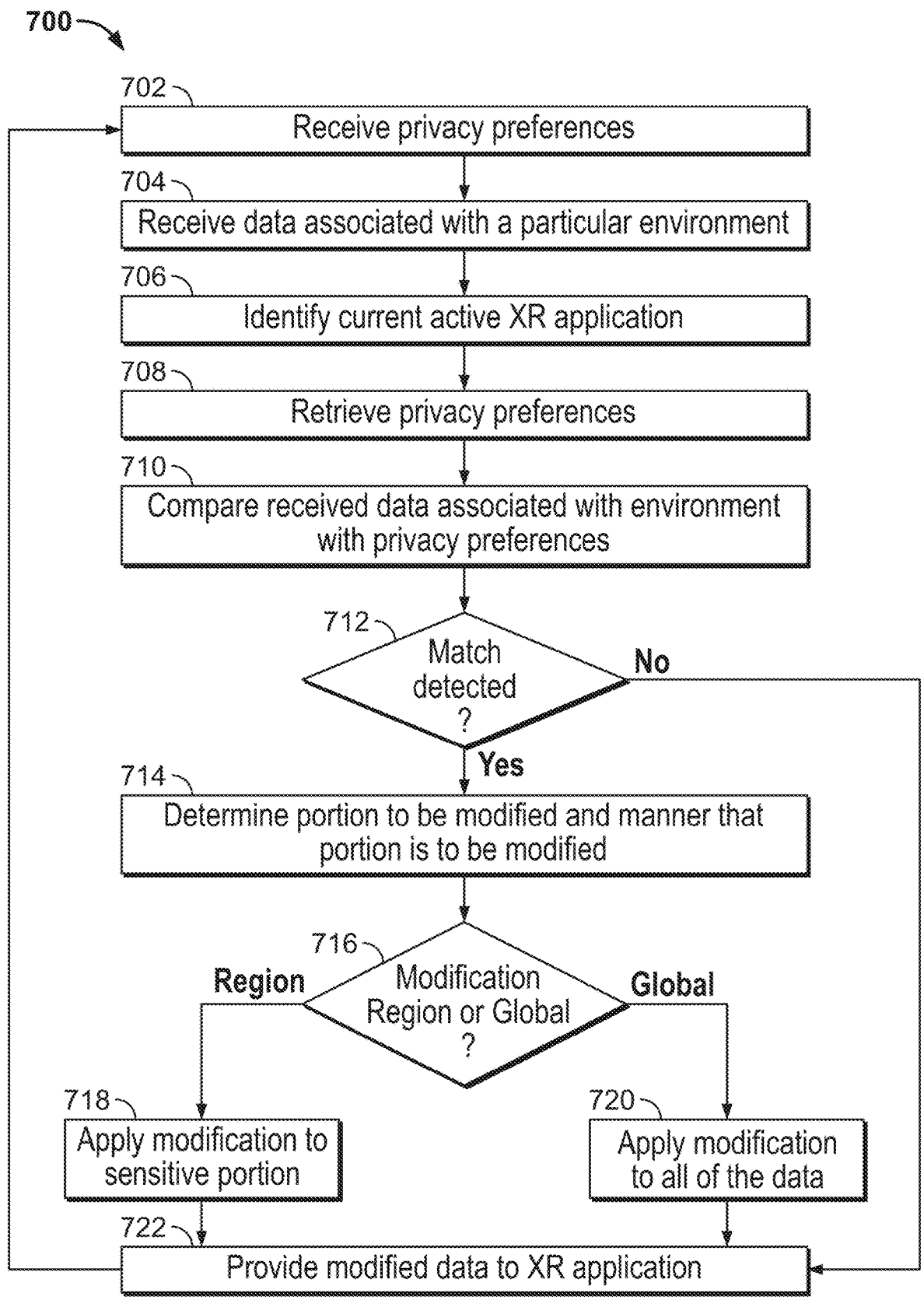
FIG. 7 is a flowchart of a detailed illustrative process for controlling an extended reality application's access to image data, in accordance with some embodiments of this disclosure.

FIG. 7 is a flowchart of a detailed illustrative process 700 controlling an extended reality application's access to image data, in accordance with some embodiments of this disclosure. In various embodiments, the individual steps of process 700 may be implemented by one or more components of the devices and systems of FIGS. 1-6 and may be performed in combination with any of the other processes and aspects described herein. Although the present disclosure may describe certain steps of process 700 (and of other processes described herein) as being implemented by certain components of the devices and systems of FIGS. 1-6, this is for purposes of illustration only. It should be understood that other components of the devices and systems of FIGS. 1-6 may implement those steps instead.

At 702, control circuitry (e.g., control circuitry 504 of user device 500 and/or control circuitry 611 of server 604) may receive privacy preferences from a user profile (e.g., associated with user 107 of FIG. 1), such as, for example, via a user device (e.g., XR device 116 of FIG. 1). For example, the interposer application described herein may receive, e.g., via the GUIs 301, 331 and 363 of FIGS. 3A-3C, specification of privacy preferences for one or more XR applications and/or for one or more environments. The user may provide the interposer application with a set of privacy descriptors and associated access transformations at a single time or periodically as the user changes his or her privacy preferences. Such selections of the user may be stored in a data structure (e.g., data structure 400 of FIG. 4) associated with a user profile of the user in connection with the interposer application. The privacy preferences may be specified on an XR application-by-XR application basis, or globally to all XR applications, or to a subset of the XR applications. The interposer application may be configured to sit between, and mediate between, an OS of a user device (e.g., user device 116 of FIG. 1), an XR framework of the user device and/or XR applications installed on or accessed via or otherwise associated with the user device. In some embodiments, the user may be prompted to specify privacy preferences in real time, e.g., when an object or user or other entity enters the FOV or gaze of the user in a particular environment, or if a user gestures at a particular object or user or other entity. In some embodiments, the interposer application may recommend certain learned privacy preferences based on the user's historical inputs or privacy preferences of other similarly situated users.

At 704, the control circuitry may receive data (e.g., image data, audio data or any other suitable data or any combination thereof) associated with a particular environment (e.g., a home 201 of FIG. 2A of the user having specified the privacy preferences). In some embodiments, a video capture driver may be coupled to a sensor (e.g., camera 114 of user device 116 of FIG. 1) configured to capture image data of the environment, and/or an audio capture driver may be coupled to a sensor (e.g., microphone 115 of user device 116 of FIG. 1). In some embodiments, the device drivers may be considered as part of or interfacing with an OS of the user device, and the OS device may be configured to transmit the captured data associated with the particular environment to the interposer application.

At 706, the control circuitry may identify a current active XR application. For example, the control circuitry may determine that an XR application is active if the user requests to access the XR application, requests the XR application to perform a particular function or requests that data be provided to the XR application, or the XR application requests to access certain data captured by the sensors of the user device. In some embodiments, the request to access data may comprise a request to use an XR application to record a video for transmission or broadcast in real time or at a later time to other users, e.g., posted on a social network application or website or otherwise stored or transmitted. The identified XR application may be the application for which the image data (and/or a modified version thereof) or other suitable data is ultimately destined.

At 708, the control circuitry may retrieve the privacy preferences specified by the user at 702. For example, the control circuitry may reference a data structure (e.g., data structure 400 of FIG. 4) generated based on a user selection entered via GUIs 301, 331 and 363 of FIGS. 3A-3C to obtain the privacy preferences specified by the user. In some embodiments, the privacy preferences for the particular XR application identified at 706 may be retrieved.

At 710, the control circuitry may compare the data received at 704 with the privacy preferences retrieved at 708. For example, the interposer application may analyze the received image data to detect objects, people, or other data in the captured image frame, on a frame-by-frame basis. In some embodiments, the interposer application may analyze scene data on a frame-by-frame basis as the image data is retrieved from the OS of the user device (e.g., user device 116 of FIG. 1). The image data may be analyzed to determine whether one or more regions of the image data contain sensitive or access-restricted objects, people or environments, based on the data specified in the privacy preferences. The interposer application may be configured to process the raw image data (e.g., received at 106) or other data passed from OS/XR framework 101 to the interposer application using any suitable computer-implemented technique. For example, the interposer application may employ image segmentation (e.g., semantic segmentation and/or instance segmentation) and classification to identify and localize different types or classes of users, objects or entities in frames captured by sensor 114 (e.g., camera). In some embodiments, the interposer application may compare portions of the captured image data to image data or templates stored in association with a corresponding label (e.g., to determine whether the image data matches a stored object or entity or user). The interposer application may compare the identified users, objects or entities to the privacy preferences, to determine whether a match exists. For example, if a confidence score based on the comparison exceeds a threshold, a match may be determined.

At 712, if one or more matches are detected, processing may proceed to 714; otherwise processing may proceed to 722. At 714, the control circuitry may determine one or more portions of the data to be modified, as well as manner(s) in which each of the one or more image portions is to be modified. In the example of FIG. 2A, the control circuitry may determine the coordinates of object 204 determined to have matched a privacy descriptor, and the manner in which object 204 is to be modified (e.g., removed from the image data or whited out, as shown in FIG. 2B). Such modification or access transformation may be retrieved from data structure 400. The control circuitry may perform such processing for each region of the image data (or other suitable data, such as, for example, audio data as discussed in association with FIG. 3C) to be modified. In some embodiments, determining whether a match is detected may be based at least in part on determining that a current environment of the user and the user device (e.g., user device 116 of user 107 in FIG. 1) is determined to match the environment or place specified in the privacy settings (e.g., a home of the user).

At 716, the control circuitry may determine whether the modification is to be applied globally to the entirety of the data (e.g., all of the images data) or only to regions or portions thereof. For example, such a setting may be specified in the user's privacy preferences. If the privacy preferences indicate a region area to be transformed, the modification may be performed (at 718) on the region(s) or portion(s) identified as containing sensitive content (e.g., based on the match data). Otherwise, the modification may be performed (at 720) on the entire image or entirety of the data.

In performing the modifications, the control circuitry may be configured to apply a set of rules that may elide or otherwise modify the raw image data before passing it to the XR application. For example, the XR application may be, based on the user's privacy preferences, prohibited from accessing the raw image data or raw audio data or raw form of other suitable data. In some embodiments, a first XR application may be prohibited from accessing such data directly, whereas another more trusted application may be permitted to access such data directly. As an example of performing the modifications, based on the selections input via FIGS. 3A-3C, the interposer application may, prior to passing image data and audio data to XR Application A, remove image data corresponding to Object A in the user's home, obscure the face of User B when User B is in the his or her bedroom or outside the hours of 9 AM-5 PM, allow access to background data, prevent access to the voice of User B and allow access to sounds corresponding to a dog barking. In some embodiments, motion of the users, objects and entities from frame to frame may be tracked to enable the modifications to be consistently applied over time across frames.

At 722, the interposer application may cause the control circuitry to pass the modified (non-sensitive) data to the XR application identified at 706. The XR application may process the modified data and add application-specific virtual content, or perform application-level image recognition. For example, if the XR application is an AR application, the XR application may enable a user to view and interact with supplemental content superimposed onto the modified image data. For example, the supplemental content may be overlaid on top of the modified real-world image so as to appear to be part of the modified real-world image displayed on a mobile device, or the supplemental content may be displayed in a portion of a display (e.g., of smart glasses) where the user may otherwise see a part of the real world. Thus, the user may be provided with an interactive XR experience that takes into account fine-grained privacy preferences of the user.

Figure 8:
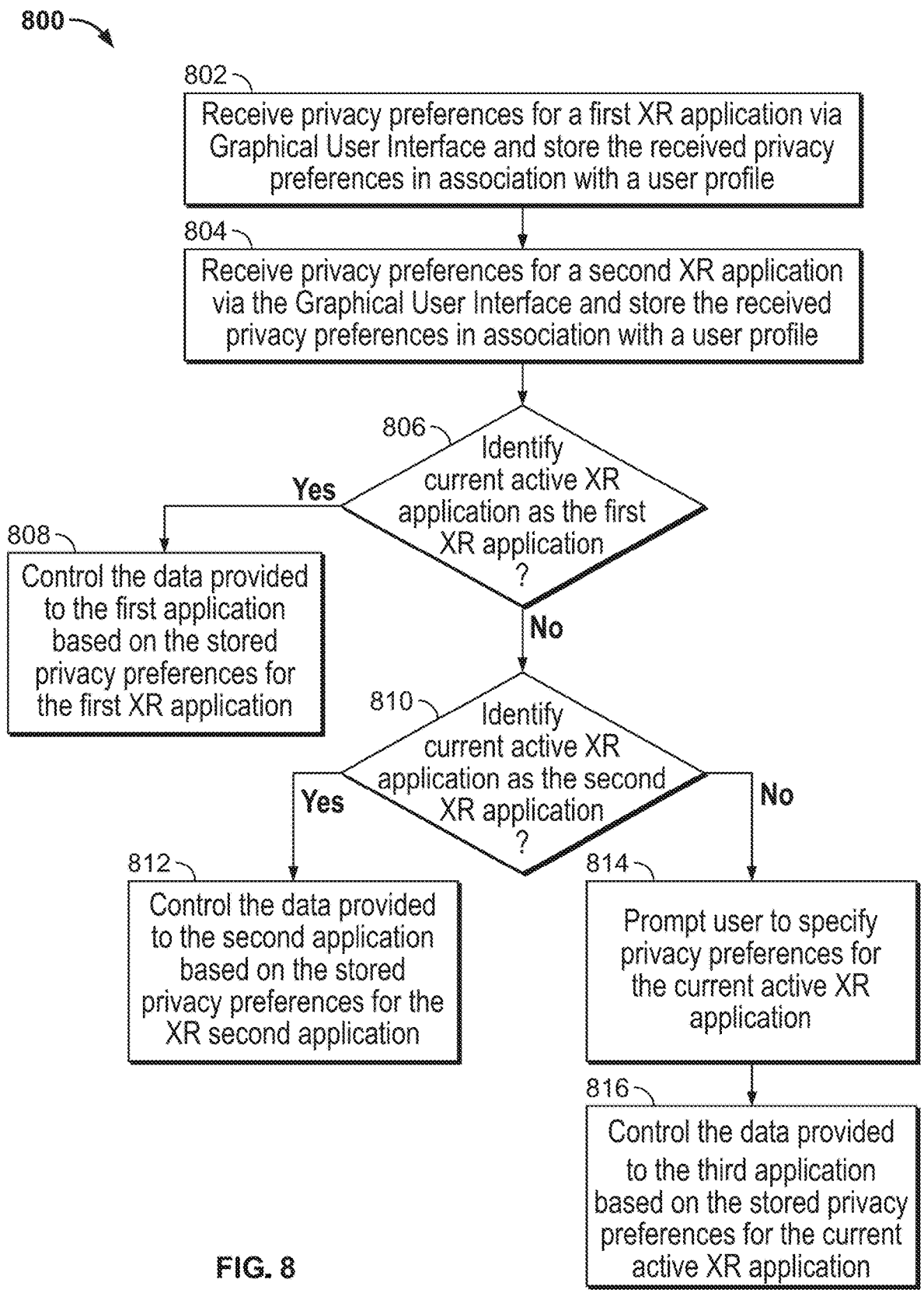
FIG. 8 is a flowchart of a detailed illustrative process for controlling an extended reality application's access to image data, in accordance with some embodiments of this disclosure.

FIG. 8 is a flowchart of a detailed illustrative process 800 for controlling an extended reality application's access to image data, in accordance with some embodiments of this disclosure. In various embodiments, the individual steps of process 800 may be implemented by one or more components of the devices and systems of FIGS. 1-6 and may be performed in combination with any of the other processes and aspects described herein. Although the present disclosure may describe certain steps of process 800 (and of other processes described herein) as being implemented by certain components of the devices and systems of FIGS. 1-6, this is for purposes of illustration only. It should be understood that other components of the devices and systems of FIGS. 1-6 may implement those steps instead.

At 802, control circuitry (e.g., control circuitry 504 of user device 500 and/or control circuitry 611 of server 604) may receive privacy preferences for a first XR application from a user profile (e.g., associated with user 107 of FIG. 1), such as, for example, via a user device (e.g., XR device 116 of FIG. 1). For example, the interposer application may receive the selections shown in the GUIs of FIGS. 3A-3C in connection with privacy preferences for XR Application A in the home of the user. The interposer application may cause the specified selections to be stored in a data structure (e.g., data structure 400 of FIG. 4). In some embodiments, the interposer application may recommend certain learned privacy preferences based on the user's historical inputs or privacy preferences of other similarly situated users.

At 804, the control circuitry may receive privacy preferences for a second XR application from the user profile via the user device. For example, the interposer application may receive selections from the user in connection with XR Application B specified in data structure 400 of FIG. 4. In some embodiments, the user may specify different privacy preferences for XR Application B than those specified for XR Application A, or the privacy preferences for XR Application A may be applied to XR Application B. For example, it may be desirable to grant XR Application B (e.g., a home inventory application designed to create an insurance record of the objects and rooms in a user's home) a greater degree of access than to a social media platform, e.g., XR Application B may be granted direct access to unmodified image data, but may not be granted direct access to all audio data, at least a portion of which may be superfluous to the intended purpose of XR Application B. While FIG. 8 describes receiving and storing privacy preferences for an XR Application A and XR Application B, different privacy preferences may be specified for any suitable number of XR applications across any suitable number of devices in association with a user profile. In some embodiments, the interposer application may recommend certain learned privacy preferences based on the user's historical inputs or privacy preferences of other similarly situated users.

At 806, the control circuitry may determine whether a currently active XR application (e.g., determined in a similar manner to block 706) corresponds to the first XR application (e.g., XR Application A of FIGS. 3A-3C and FIG. 4). If so, processing may proceed to 808, where the interposer application may control the data provided to the first XR application based on the stored privacy preferences (e.g., specified via GUIs of FIGS. 3A-3C for the first XR application and stored in data structure 400). On the other hand, if the currently active XR application does not correspond to the first XR application, processing may proceed to 810.

At 810, the control circuitry may determine whether a currently active XR application (e.g., determined in a similar manner to block 706) corresponds to the second XR application (e.g., XR Application B of FIG. 4). If so, processing may proceed to 812, where the interposer application may control the data provided to the first XR application based on the stored privacy preferences (e.g., specified via GUIs of FIGS. 3A-3C for the second XR application and stored in data structure 400). On the other hand, if the currently active XR application does not correspond to the second XR application, processing may proceed to 814.

At 814, the interposer application may prompt the user to specify privacy preferences for a third XR application, such as if the user is attempting to utilize a new XR application not yet associated with privacy preferences of the interposer application. For example, the user may enter privacy preferences via the GUIs of FIGS. 3A-3C. In some embodiments, the interposer application may recommend certain learned privacy preferences based on the user's historical inputs or privacy preferences of other similarly situated users. Alternatively, the XR application may retrieve privacy preferences for the current XR application (e.g., a third XR application), if such preferences are already stored. At 816, the interposer application may control the data provided to the third XR application based on the stored privacy preferences (e.g., specified via GUIs of FIGS. 3A-3C for the second XR application and stored in data structure 400).

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method, comprising:
receiving, by an interposer application, image data from a video capture driver;
determining, by the interposer application and based on privacy preferences of a user profile, whether a region of the image data comprises sensitive content;
in response to determining that the region of the image data comprises sensitive content, modifying the image data by applying, by the interposer application, a modification to the region of the image data; and
providing, by the interposer application and to an extended reality (XR) application, the modified image data, wherein the XR application is prohibited from directly accessing data from the video capture driver.

2. The method of claim 1, wherein the XR application is a first XR application, and the method further comprises:
determining, based on the privacy preferences of the user profile, that the first XR application is prohibited from directly accessing data from the video capture driver; and
determining, based on the privacy preferences of the user profile, that a second XR application is permitted to directly access data from the video capture driver.

3. The method of claim 1, wherein:
the XR application is a first XR application;
the interposer application is configured to manage access to image data from the video capture driver for a plurality of XR applications including the first XR application based on the privacy preferences of the user profile; and
the privacy preferences indicate first criteria for determining whether the region of image data comprises sensitive content for the first XR application and indicate second criteria for determining whether the region of image data comprises sensitive content for a second XR application of the plurality of XR applications, the first criteria being different from the second criteria.

4. The method of claim 1, wherein:
the privacy preferences indicate that, with respect to the XR application, a particular user being at a particular location within a particular environment comprises sensitive content;
determining that the region of the image data comprises sensitive content comprises determining that the region of the image data corresponds to the particular user at the particular location within the particular environment; and
performing the modifying of the image data based on the privacy preferences and based on determining that the image data is to be transmitted to the XR application.

5. The method of claim 1, wherein:
the privacy preferences indicate that, with respect to the XR application, a particular object comprises sensitive content;
determining that the region of the image data comprises sensitive content comprises determining that the region of the image data corresponds to the particular object; and
performing the modifying of the image data based on the privacy preferences and based on determining that the image data is to be transmitted to the XR application.

6. The method of claim 1, wherein:
the privacy preferences indicate that, with respect to the XR application, image data that is captured at a particular time and/or a particular location comprises sensitive content;
determining that the region of the image data comprises sensitive content comprises determining that the image data was captured at the particular time and/or the particular location; and
performing the modifying of the image data based on the privacy preferences and based on determining that the image data is to be transmitted to the XR application.

7. The method of claim 1, wherein modifying the image data comprises removing the region from the image data or obscuring the region or substituting other content for the region.

8. The method of claim 1, further comprising:
receiving, by the interposer application, audio data;
determining, by the interposer application and based on the privacy preferences of the user profile, whether a portion of the audio data comprises sensitive content with respect to the XR application;
in response to determining that a portion of the audio data comprises sensitive content with respect to the XR application, modifying the audio data by applying, by the interposer application, a modification to the portion of the audio data; and providing, by the interposer application and to the XR application, the modified audio data.

9. The method of claim 1, further comprising:
generating for display, by the interposer application, a graphical user interface providing a plurality of options for specifying privacy preferences for a plurality of XR applications including the XR application;
receiving input associated with whether a region of image data should be considered sensitive content for the XR application; and
determining the privacy preferences of the user profile for the XR application based on the received input.

10. The method of claim 1, further comprising:
detecting an object in the image data not associated with the privacy preferences;
prompting a user with a request to specify whether the detected object should be associated with the privacy preferences; and
updating the privacy preferences based on a response to the prompting.

11. The method of claim 1, further comprising:
determining whether user gaze is directed to a particular region of a particular environment corresponding to the image data being captured by a user device associated with the user profile; and
determining to modify the particular region based on the privacy preferences.

12. A computer-implemented system, comprising:
memory;
control circuitry configured to:
receive, by an interposer application, image data from a video capture driver;
determine, by the interposer application and based on privacy preferences of a user profile, whether a region of the image data comprises sensitive content, wherein the user profile is stored in the memory;
in response to determining that the region of the image data comprises sensitive content, modify the image data by applying, by the interposer application, a modification to the region of the image data; and
provide, by the interposer application and to an extended reality (XR) application, the modified image data, wherein the XR application is prohibited from directly accessing data from the video capture driver.

13. The system of claim 12, wherein the XR application is a first XR application, and the control circuitry is further configured to:
determine, based on the privacy preferences of the user profile, that the first XR application is prohibited from directly accessing data from the video capture driver; and
determine, based on the privacy preferences of the user profile, that a second XR application is permitted to directly access data from the video capture driver.

14. The system of claim 12, wherein:
the XR application is a first XR application;
the interposer application is configured to manage access to image data from the video capture driver for a plurality of XR applications including the first XR application based on the privacy preferences of the user profile; and
the privacy preferences indicate first criteria for determining whether a region of image data comprises sensitive content for the first XR application and indicate second criteria for determining whether the region of image data comprises sensitive content for a second XR application of the plurality of XR applications, the first criteria being different from the second criteria.

15. The system of claim 12, wherein:
the privacy preferences indicate that, with respect to the XR application, a particular user being at a particular location within a particular environment comprises sensitive content;
the control circuitry is further configured to determine that the region of the image data comprises sensitive content by determining that the region of the image data corresponds to the particular user at the particular location within the particular environment; and
the control circuitry is further configured to modify the image data based on the privacy preferences and based on determining that the image data is to be transmitted to the XR application.

16. The system of claim 12, wherein:
the privacy preferences indicate that, with respect to the XR application, a particular object comprises sensitive content;
the control circuitry is further configured to determine that the region of the image data comprises sensitive content by determining that the region of the image data corresponds to the particular object; and
the control circuitry is further configured to modify the image data based on the privacy preferences and based on determining that the image data is to be transmitted to the XR application.

17. The system of claim 12, wherein:
the privacy preferences indicate that, with respect to the XR application, image data that is captured at a particular time and/or a particular location comprises sensitive content;
the control circuitry is further configured to determine that the region of the image data comprises sensitive content by determining that the image data was captured at the particular time and/or the particular location; and
the control circuitry is further configured to modify the image data based on the privacy preferences and based on determining that the image data is to be transmitted to the XR application.

18. The system of claim 12, wherein the control circuitry is further configured to modify the image data by obscuring the region or substituting other content for the region.

19. The system of claim 12, wherein the control circuitry is further configured to:
receive, by the interposer application, audio data;
determine, by the interposer application and based on the privacy preferences of the user profile, whether a portion of the audio data comprises sensitive content with respect to the XR application;
in response to determining that a portion of the audio data comprises sensitive content with respect to the XR application, modify the audio data by applying, by the interposer application, a modification to the portion of the audio data; and
provide, by the interposer application and to the XR application, the modified audio data.

20. The system of claim 12, wherein the control circuitry is further configured to:
generate for display, by the interposer application, a graphical user interface providing a plurality of options for specifying privacy preferences for a plurality of XR applications including the XR application;

receive input associated with whether a region of image data should be considered sensitive content for the XR application; and determine the privacy preferences of the user profile for the XR application based on the received input.

21. The system of claim 12, wherein the control circuitry is further configured to:

detect an object in the image data not associated with the privacy preferences;

prompt a user with a request to specify whether the detected object should be associated with the privacy preferences; and update the privacy preferences based on a response to the prompting.

22. The system of claim 12, wherein the control circuitry is further configured to:

determine whether user gaze is directed to a particular region of a particular environment corresponding to the image data being captured by a user device associated with the user profile; and determine to modify the particular region based on the privacy preferences.

* * * * *